(12) United States Patent
Shinohara et al.

(10) Patent No.: US 10,992,167 B2
(45) Date of Patent: Apr. 27, 2021

(54) POWER SUPPLY CIRCUIT, POWER SUPPLY SYSTEM, AND CONTROL METHOD

(71) Applicant: RENESAS ELECTRONICS CORPORATION, Tokyo (JP)

(72) Inventors: Noriyuki Shinohara, Tokyo (JP); Akira Kuwano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/597,587

(22) Filed: Oct. 9, 2019

(65) Prior Publication Data

US 2020/0153268 A1    May 14, 2020

(30) Foreign Application Priority Data

Nov. 13, 2018    (JP) ............................. JP2018-212850

(51) Int. Cl.
*H02J 13/00*    (2006.01)
*H02M 1/00*    (2006.01)
(Continued)

(52) U.S. Cl.
CPC .......... *H02J 9/005* (2013.01); *H02J 13/0001* (2020.01); *H02J 13/00009* (2020.01);
(Continued)

(58) Field of Classification Search
CPC ........ H02J 1/00; H02J 9/005; H02J 13/00006; H02J 13/00007; H02J 13/00009; H02J 13/0001; H02J 13/0003; H02J 13/00032; H02J 13/00036; H02M 1/00; H02M 3/00; H02M 3/02; H02M 3/156; H02M 2001/0003; H02M 2001/0006;
(Continued)

(56) References Cited

U.S. PATENT DOCUMENTS

| 9,047,075 B1* | 6/2015 | Lee ......................... G06F 1/263 |
| 2006/0193153 A1* | 8/2006 | Erdl ................... H02M 3/33592 363/16 |

(Continued)

FOREIGN PATENT DOCUMENTS

JP    2017-168954 A    9/2017

*Primary Examiner* — Levi Gannon
(74) *Attorney, Agent, or Firm* — McDermott Will & Emery LLP

(57) ABSTRACT

To extend the transmission distance with the voltage supply source and improve the communication performance of PLCs Solution. The power supply circuit includes a step-down DC/DC converter to which a voltage supplied from the power line is input and to which an input voltage is stepped down and output, a step-up/down DC/DC converter to which a voltage output from the step-down DC/DC converter or a voltage supplied from the power line is input and to which the input voltage is stepped up or stepped down and output to the power line communication circuit, a switch circuit for connecting an input of the step-up/down DC/DC converter to an output of the step-down DC/DC converter or power line, a voltage monitoring circuit for monitoring a voltage supplied from the power line, and a control circuit for controlling connection of the switch circuit based on the voltage value of the voltage supplied from the power line.

19 Claims, 24 Drawing Sheets

(51) Int. Cl.
*H04B 3/54* (2006.01)
*H02J 9/00* (2006.01)

(52) U.S. Cl.
CPC .............. *H04B 3/54* (2013.01); *H04B 3/548* (2013.01); *H02M 2001/007* (2013.01)

(58) Field of Classification Search
CPC .... H02M 2001/0067; H02M 2001/007; H04B 3/54; H04B 3/548
See application file for complete search history.

(56) References Cited

U.S. PATENT DOCUMENTS

| | | | | |
|---|---|---|---|---|
| 2009/0039831 | A1* | 2/2009 | Ichikawa | B60L 58/15 320/118 |
| 2010/0138087 | A1* | 6/2010 | Takaoka | B60L 53/65 701/22 |
| 2012/0181990 | A1* | 7/2012 | Asakura | H02J 5/00 320/137 |
| 2013/0108938 | A1* | 5/2013 | Kake | H01M 8/04253 429/416 |
| 2016/0114690 | A1* | 4/2016 | Matsubara | B60L 11/1861 307/10.1 |
| 2018/0043788 | A1* | 2/2018 | Kuribara | B60L 11/1868 |
| 2018/0105042 | A1* | 4/2018 | Kuribara | B60L 53/53 |
| 2019/0237979 | A1* | 8/2019 | Yamada | B60L 50/51 |
| 2019/0329663 | A1* | 10/2019 | Kominami | H02M 1/088 |
| 2020/0136406 | A1* | 4/2020 | Suzuki | B60L 1/00 |

* cited by examiner

POWER SUPPLY CIRCUIT, POWER SUPPLY SYSTEM, AND CONTROL METHOD

CROSS-REFERENCE TO RELATED APPLICATIONS

The disclosure of Japanese Patent Application No. 2018-212850 filed on Nov. 13, 2018 including the specification, drawings and abstract is incorporated herein by reference in its entirety.

BACKGROUND

The present invention relates to a power supply circuit, and the present invention can be suitably applied to, for example, a power supply circuit for power line communication (PLC: Power Line Communication).

Power line communication (hereinafter, referred to as PLC as appropriate) is to perform PLC communication using AC or DC power lines.

For example, Japanese unexamined Patent Application publication JP-A-2017-168954 discloses a power supply circuit for an AC-PLC using an AC power line. The power supply circuit disclosed in JP-A-2017-168954 converts an AC voltage supplied from a voltage supply source via the AC power line to a DC voltage and supplies the converted DC voltage to a communication device.

SUMMARY

As described above, the power supply circuit disclosed in JP-A-2017-168954 is a power supply circuit for an AC-PLC using an AC power line.

Recently, however, the demand for a DC-PLC using a DC power line has been increased.

Here, in order to realize the DC-PLC, it is considered that the power supply circuits for the DC-PLC needs to extend the transmission distance between the power supply circuits and the voltage supply sources and improve the communication performance.

Other objects and novel features will become apparent from the description of this specification and the accompanying drawings.

According to one embodiment, the power supply circuit includes a step-down DC/DC converter that steps down and outputs the voltage supplied from the power line, a step-up DC/DC converter that steps up or steps down the voltage output from the step-down DC/DC converter or the voltage supplied from the power line and outputs the voltage to the power line communication circuit, and a switch circuit that connects the input of the step-up/down DC/DC converter to the output of the step-down DC/DC converter or the power line. The connection of the switch circuit is controlled based on the voltage value of the voltage supplied from the power line.

The connection of the switch circuit is controlled based on the voltage value of the voltage supplied from the power line.

According to the above-mentioned embodiment, it is possible to contribute to the solution of the above-mentioned problem.

DETAILED DESCRIPTION

Figure 1:
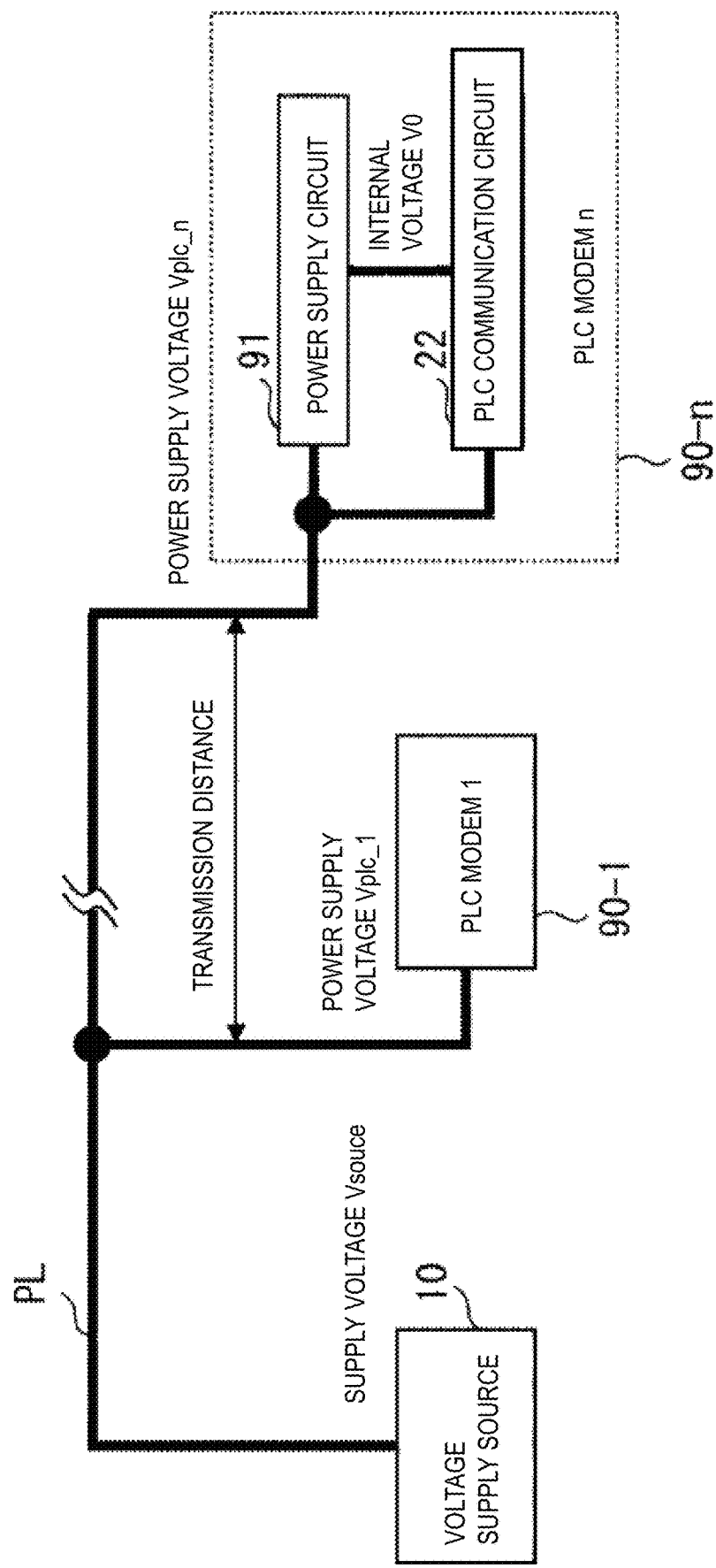
FIG. 1 is a diagram showing an example of the configuration of a power supply system according to the related art.

The following description and the drawings are appropriately omitted and simplified for clarity of description.

In the drawings, the same elements are denoted by the same reference numerals, and a repetitive description thereof is omitted as necessary.

Prior to describing each embodiment, first, a related art discussed by the present inventors will be described. The embodiments and related technologies described below are based on the DC-PLC of using DC power line.

FIG. 1 shows an exemplary configuration of a power supply system according to the related art. As shown in FIG. 1, the related art power supply system includes a voltage supply source 10 and n (n is a natural number of 2 or more) PLC modem 90-1 to 90-$n$ (hereinafter, simply referred to as "PLC modem 90" if PLC modem 90-1 to 90-$n$ is not specified). The voltage supply source 10 and the n pieces of PLC modem 90-1 to 90-$n$ are connected via DC power line PLs.

In the voltage supply source 10, each of the PLC modem 90-1 to 90-$n$ for supplying DC voltages to the DC power line PLs includes a power supply circuit 91 and a PLC communication circuit 22. The power supply circuit 91 supplies DC voltages supplied from the DC power line PLs to the PLC communication circuit 22. The PLC communication circuit 22 receives voltages supplied from the power supply circuit 91, operates, and performs PLC communication via the DC power line PL. The PLC communication circuit 22 includes a PLC modem LSI (Large Scale Integration), a modulator for modulating transmit PLC signal, a demodulator for demodulating reception PLC signal, and the like.

Here, the transmission distance L between the PLC modem 90-1 having the shortest distance from the voltage supply source 10 and the PLC modem 90-$n$ having the longest distance from the voltage supply source 10 is currently about 9 kilometers at the maximum. The supply voltage (hereinafter referred to as PLC modem power supply voltage) Vplc_n supplied to the PLC modem 90-$n$ drops due to the wire resistor of the DC power line PL and the current consumed by the other PLC modem 90 connected to the DC power line PL, and the drop increases in proportion to the transmission distance L of the DC power line PL.

Figure 2:
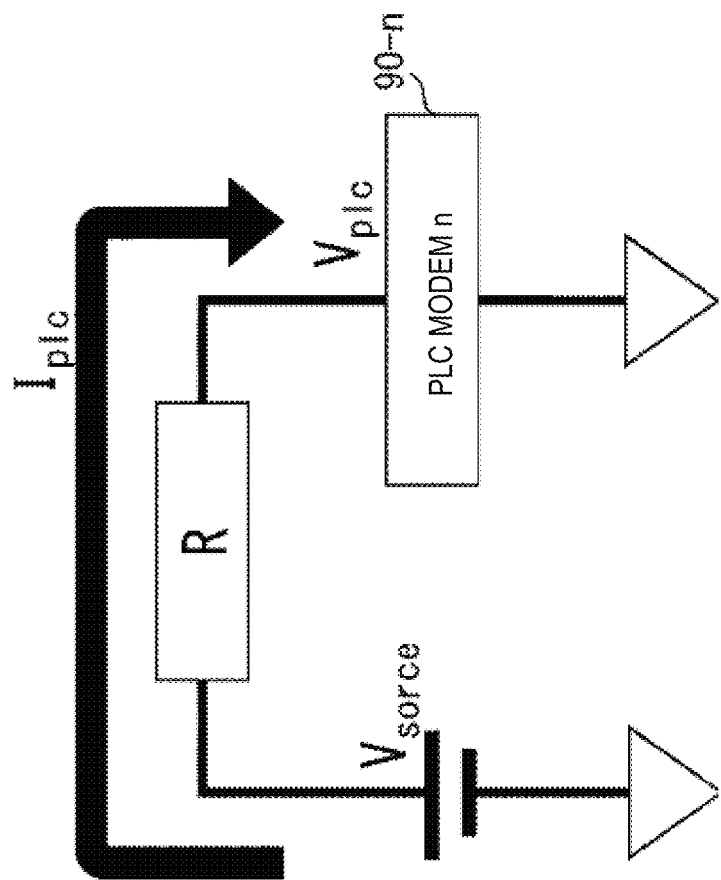
FIG. 2 is a diagram showing an example of a principle model for representing a phenomenon when a PLC modem is connected to a DC power line in a power supply system according to the related art.

FIG. 2 shows examples of theoretical models for expressing phenomena when the PLC modem 90-$n$ is connected to the DC power line PLs in the power supply system according to the related art.

In FIG. 2, the PLC modem power supply voltage Vplc_n supplied to the PLC modem 90-$n$ is shown as Vplc. In FIG. 2, the conductor resistance R of the DC power line PL is obtained by the following equation (1), and the conductor resistance R increases in proportion to the transmission distance L. When the conductor resistance R increases, the PLC modem power supply voltage Vplc drops due to the consumed current I plc flowing through the DC power line PL and the conductor resistance R of the DC power line PL, as shown in Equation (2) below.

[Equation 1]

$$R = \rho L / S \quad (1)$$

[Equation 2]

$$Vplc = Vsorce - (Iplc * R) \quad (2)$$

In the above equations (1) and (2), p is the resistivity of the DC power line PL, S is the cross-sectional area of the DC power line PL, and Vsorce is the supply voltage supplied from the voltage supply source 10.

Figure 3:
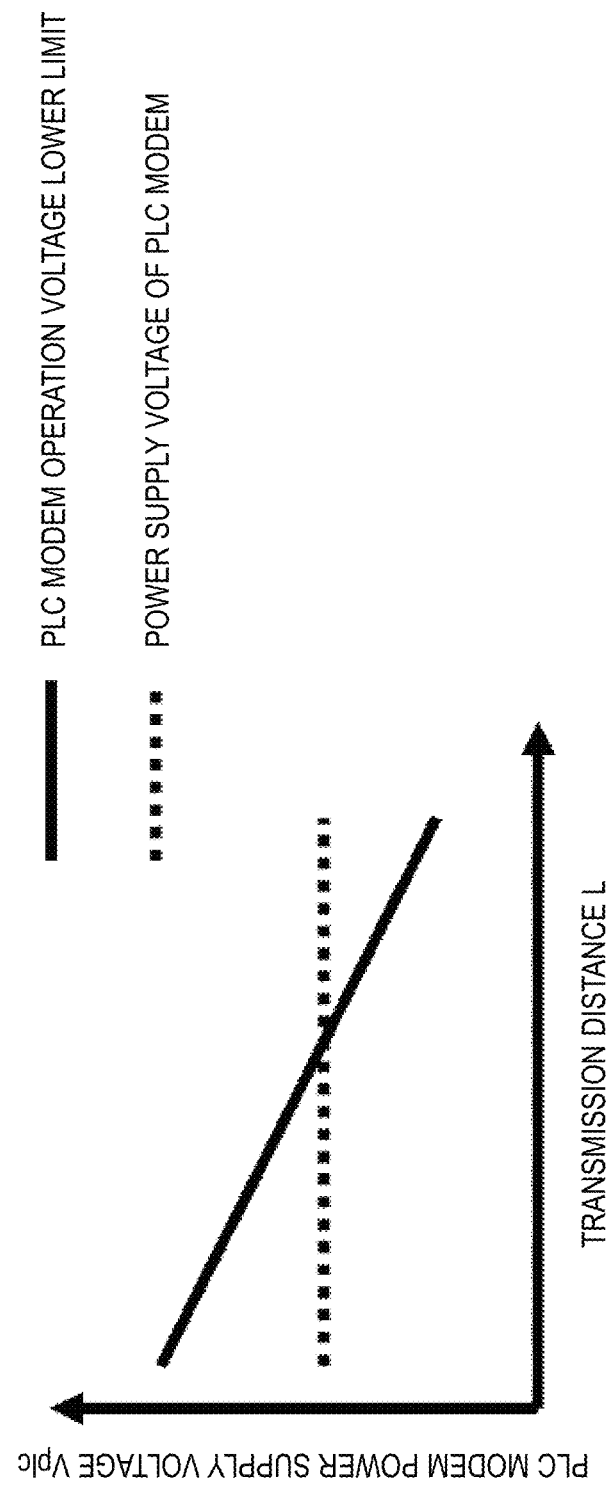
FIG. 3 is a diagram showing an example of a voltage drop phenomenon of a PLC modem power supply voltage according to the related art.

Therefore, the longer the PLC modem 90-$n$ is from the voltage supply source 10, the lower the PLC modem power supply voltage Vplc is with respect to the supply voltage Vsorce supplied from the voltage supply source 10 to the DC power line PLs. FIG. 3 shows examples of voltage-drop phenomena of a PLC modem power supply voltage Vplc according to the related art. Therefore, as shown in FIG. 3, when the PLC modem power supply voltage Vplc is lower than the voltage at which the PLC modem 90-$n$ eventually stops operating (hereinafter referred to as PLC modem operation voltage lower limit), the PLC modem 90-$n$ stops operating.

Figure 4:
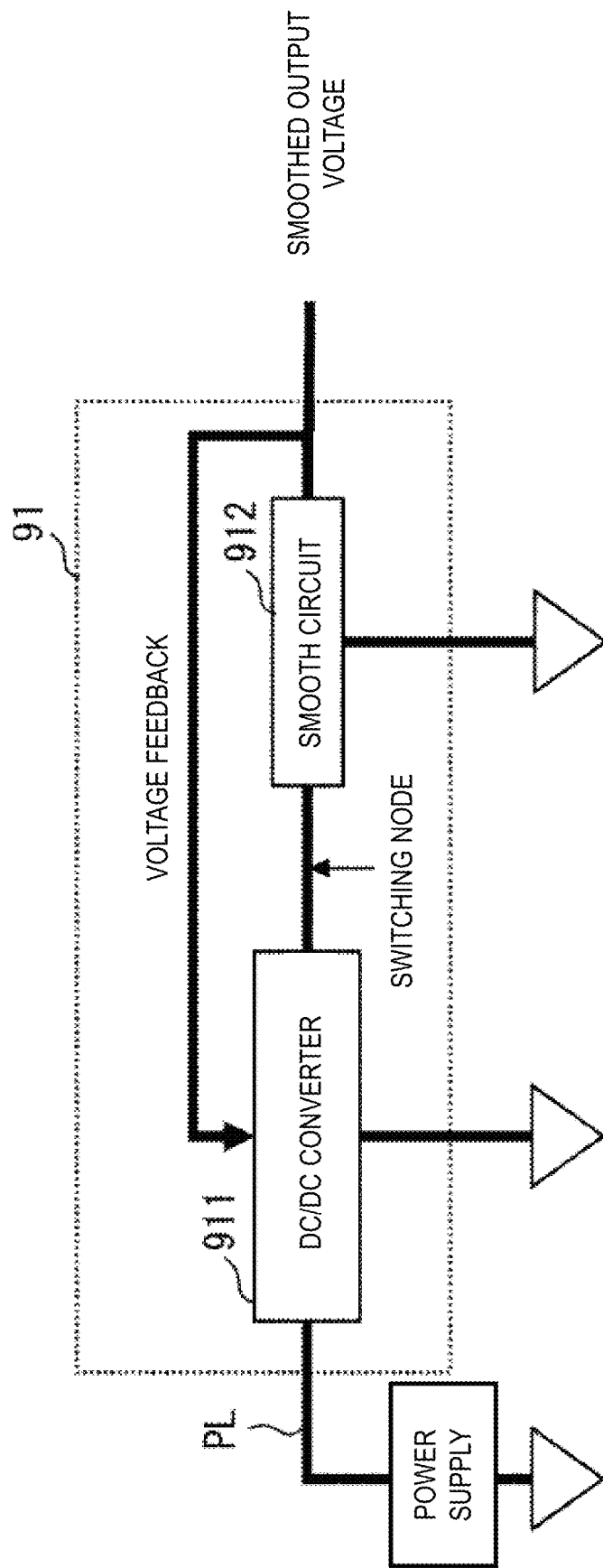
FIG. 4 is a view showing a configuration example of a power supply circuit according to the related art.
Figure 5:
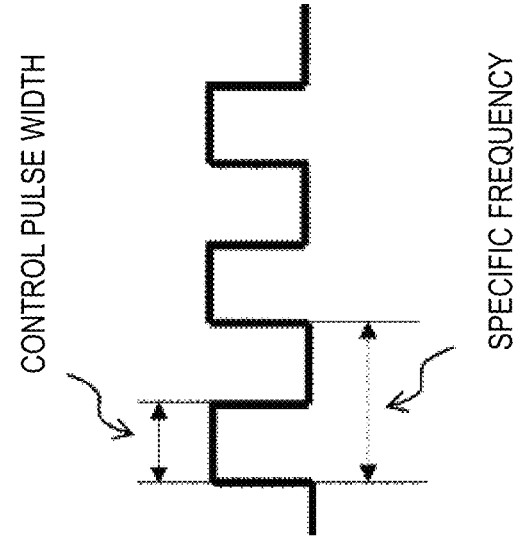
FIG. 5 is a diagram showing an example of voltages at switching nodes in an output stage of a DC/DC converter according to the related art.

FIG. 4 shows an exemplary configuration of a power supply circuit 91 according to the related art. As shown in FIG. 4, the power supply circuit 91 according to the related art includes a DC/DC converter 911 and a smooth circuit 912. FIG. 5 shows examples of voltages at switching nodes in an output stage of a DC/DC converter 911 according to the related art. The DC/DC converter 911 steps down the voltage supplied from the DC power line PL and outputs the stepped-down voltage. At this time, as shown in FIG. 5, the DC/DC converter 911 controls the pulse width of the output pulse voltage by specific frequency (hereinafter referred to as a switching frequency). The smooth circuit 912 smoothes the voltages output from the DC/DC converter 911 to generate and output smoothed output voltage. This smoothed output voltage is supplied to the PLC communication circuit 22 as the internal voltage V 0 shown in FIG. 1.

Figure 6:
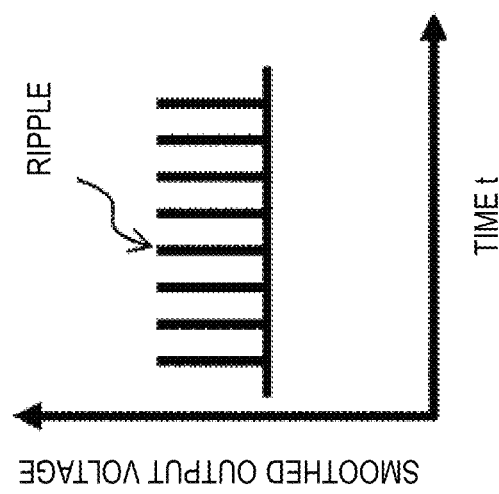
FIG. 6 is a diagram showing an example of the waveform of the smoothed output voltage output from the power supply circuit according to the related art.

FIG. 6 shows examples of waveforms of smoothed output voltage outputted from the power supply circuit 91 according to the related art. As described above, the power supply circuit 91 according to the related art generates the smoothed output voltage by controlling the pulse width of the pulsed voltage outputted from the DC/DC converter 911 at the switching frequency and smoothing the voltage by the smooth circuit 912. Therefore, as shown in FIG. 6, at the output stage of the smooth circuit 912, a ripple remains at the output stage at the switching timing, and this ripple becomes noisy. Noise due to this ripple is generated in the same frequency band as the switching frequency. Therefore, when the DC/DC converter 911 is used in the DC-PLC communication, the DC/DC converter 911 operating at a switching frequency higher than the frequency used in the DC-PLC communication needs to be used.

Figure 7:
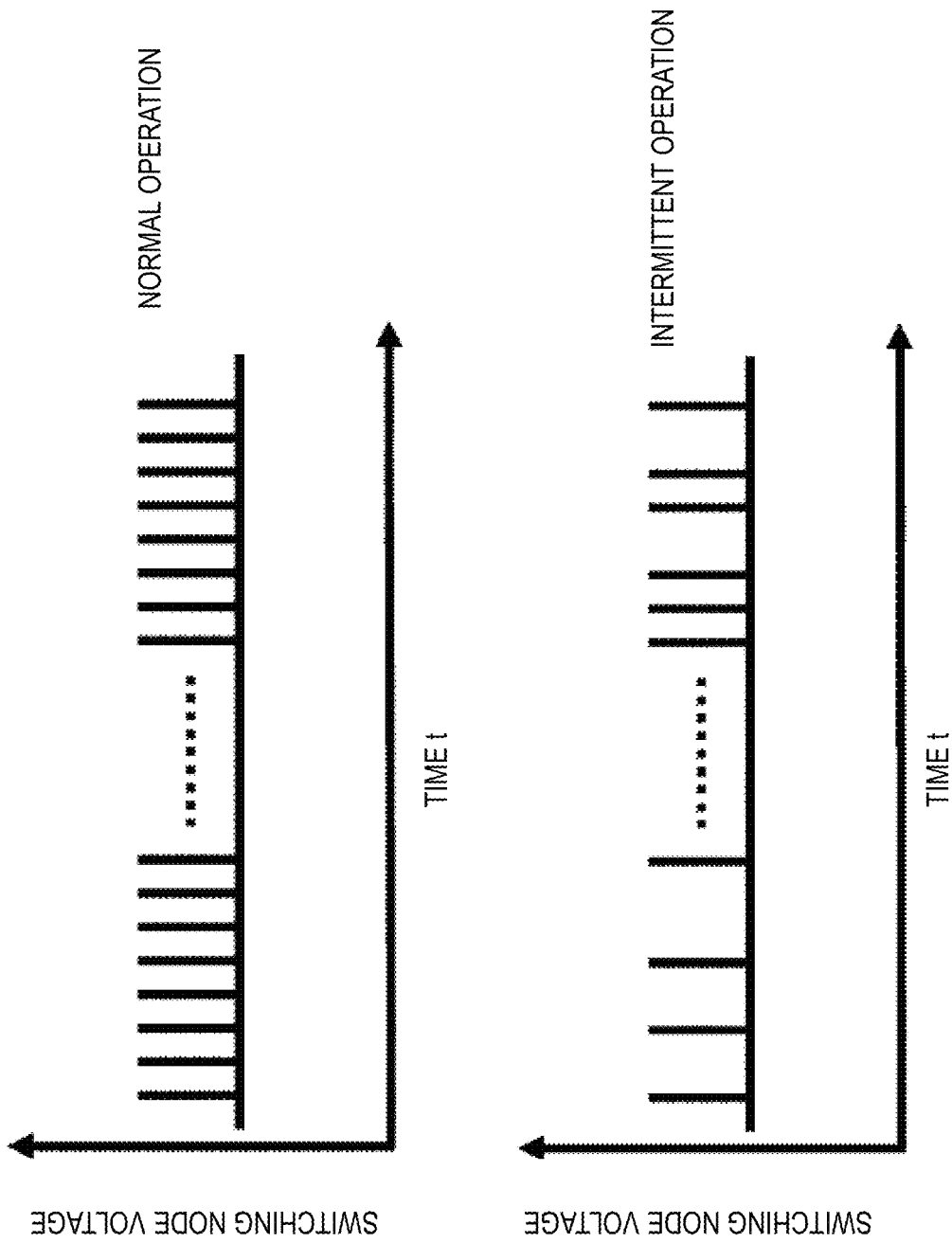
FIG. 7 is a diagram showing an example of a phenomenon of switching failure which occurs when a step-down DC/DC converter is used as a DC/DC converter in a power supply circuit according to a related art.

FIG. 7 shows examples of the phenomena of a switching defect that occurs when a step-down DC/DC converter is used as the DC/DC converter 911 in the power supply circuit 91 according to the related art. FIG. 7 shows the voltages at the switching nodes in the output-stage of the DC/DC converter 911. The DC/DC converter 911 turns ON/OFF coils (not shown) at switching timings. However, when step-down DC/DC converter is used as the DC/DC converter 911, under the condition that the input/output potential ratio of DC/DC converter is large and the consumed current of DC/DC converter is low, the pulse width shown in FIG. 5 is narrowed at the time of ON/OFF the coils, so that the switching does not catch up, and the phenomena of a lack of switching (hereinafter referred to as intermittent operation) as shown in FIG. 7 occur. This phenomena is caused by the fact that it becomes unnecessary to supply electric charge to the switching node, and the electric charge of the switching node is reduced, so that the pulse width becomes thinner and does not respond.

When this intermittent operation occurs, noises are generated in a frequency band equal to or lower than the switching frequency. Because of this effect, noises are also generated in the frequency band used in the DC-PLC communication, so that the communication performance of the DC-PLC communication is deteriorated.

Figure 8:
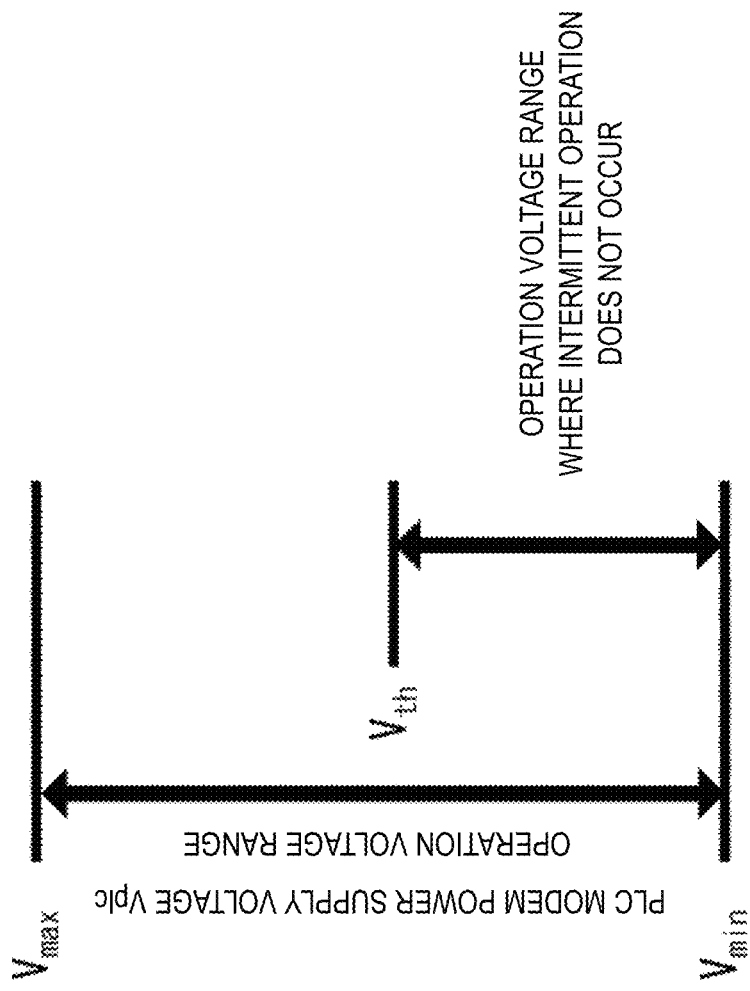
FIG. 8 is a diagram showing an example of the power supply voltage range of the PLC modem in which the intermittent operation does not occur in the power supply circuit according to the related art.

FIG. 8 shows examples of power supply voltage ranges of the PLC modem 90 in which intermittent operation does not occur. In FIG. 8, V max is Input maximum voltage indicating the maximum voltage of the Vplc, Vth is intermittent operation threshold voltage indicating the voltage of the Vplc when intermittent operation occurs in the PLC modem 90, and V min is DC/DC operation lower limit voltage indicating the minimum voltage of the Vplc and the lower limit voltage at which the DC/DC converter 911 operates (same as in FIG. 12 hereafter). When the PLC modem 90 is used, there are many patterns in which the potential difference of the inputs to the PLC modem 90 (i.e., Vplc) varies greatly, but the variation of the consumed current flowing through the DC power line PLs is known. Therefore, whether or not intermittent operation occurs in the PLC modem 90 is dominated by the potential difference variation of the inputs to the PLC modem 90. Therefore, in the PLC modem 90, as shown in FIG. 8, the DC/DC converter 911 needs to be used with a potential difference in which intermittent operation is not generated. Note that in FIG. 8, the Vth is set so that the potential difference between the V min and the Vth falls within a predetermined range in which intermittent operation does not occur, but the present invention is not limited thereto. The Vth may be set so that the potential difference between the V max and the Vth falls within a predetermined range.

As described above, in the power supply circuit 91 according to the related art, since the PLC modem power supply voltage Vplc drops in proportion to the transmission distance L of the DC power line PL, there is a problem that the transmission distance with the voltage supply source 10 cannot be extended. Further, the power supply circuit 91 according to the related art has a problem that communication performance of DC-PLC communication is deteriorated because noises are generated in frequencies used in DC-PLC communication due to the effect of intermittent operation. Each of the embodiments described below solves at least one of the above-mentioned problems.

Figure 9:
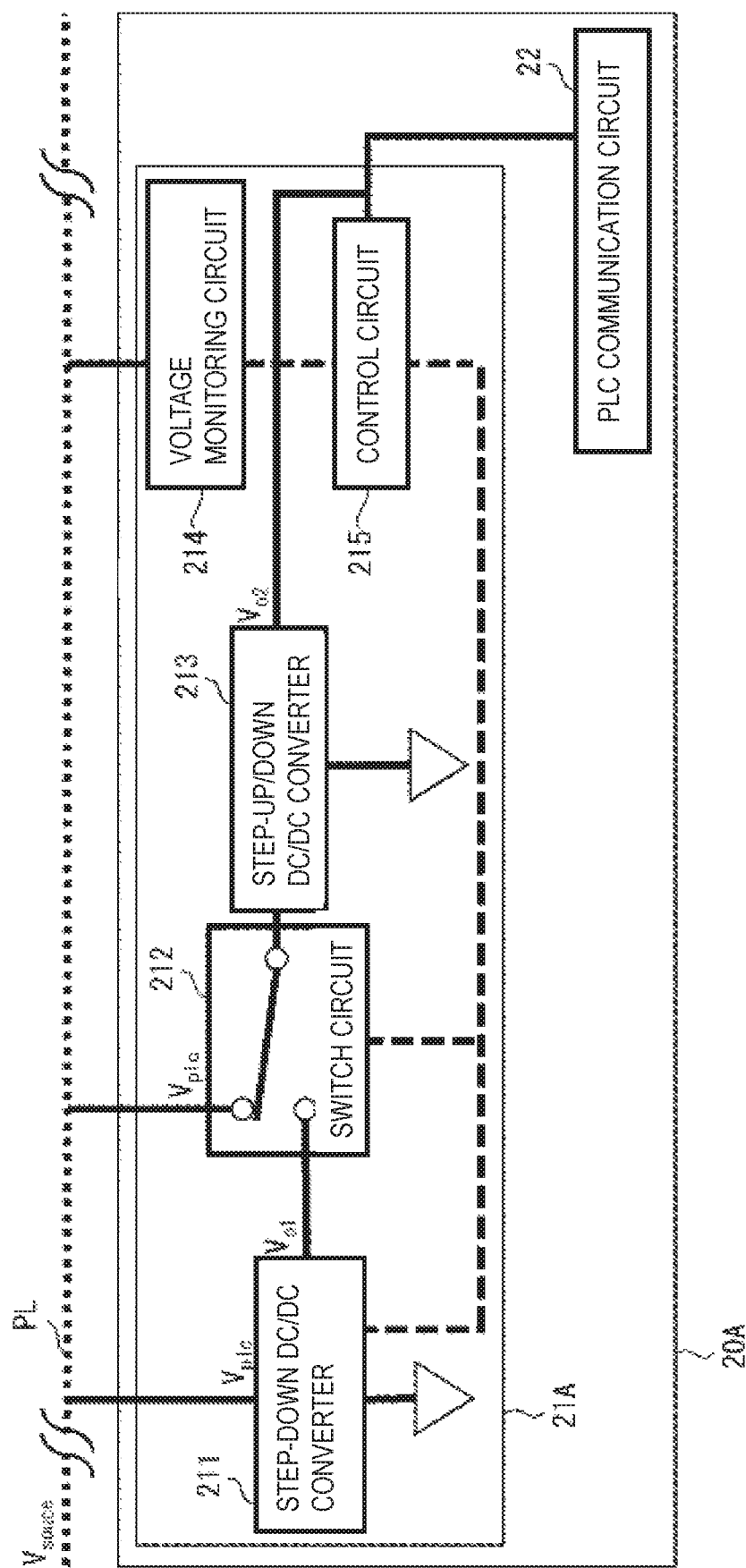
FIG. 9 is a diagram showing a configuration example of a PLC modem according to the first embodiment.

FIG. 9 shows an exemplary configuration of a PLC modem 20A according to the present first embodiment. As shown in FIG. 9, the PLC modem 20A according to present embodiment 1 differs from the PLC modem 90 according to the related art shown in FIG. 1 in that the power supply circuit 91 is replaced with the power supply circuit 21 A. In FIG. 9, it is assumed that the PLC modem power supply voltage Vplc is supplied from the DC power line PLs to the PLC modem 20A. The dotted line indicates the DC power line PL, the solid line indicates the power supply line of transmitting the power supply voltage supplied to the components in the PLC modem 20A, and the broken line indicates the control line of transmitting the control signals (the same in FIGS. 10, 11, and 14-19).

The power supply circuit 21 A includes a step-down DC/DC converter 211, a switch circuit 212, a step-up/down DC/DC converter 213, a voltage monitoring circuit 214, and a control circuit 215. The PLC modem power supply voltage Vplc supplied from the DC power line PL is input to the step-down DC/DC converter 211, and the input PLC modem power supply voltage Vplc is stepped down to be output as the output voltage V o1. The output voltage V o1 output from the step-down DC/DC converter 211 or the PLC modem power supply voltage Vplc supplied from the DC power line PL is input to the step-up/down DC/DC converter 213, and the input V o1 or Vplc is boosted or stepped down to be output as the output voltage V o2. The output voltage Vo2 is smoothed by a smooth circuit (corresponding to the smooth circuit 912 shown in FIG. 4) provided at the subsequent stage of the step-up/down DC/DC converter 213, and the smoothed output voltage Vo2 is supplied as a power supply voltage to the control circuit 215 and the PLC communication circuit 22.

The switch circuit 212 connects the inputs of the step-up/down DC/DC converter 213 to the outputs or DC power line PLs of the step-down DC/DC converter 211. The voltage monitoring circuit 214 monitors the PLC modem power supply voltage Vplc supplied from the DC power line PLs. The control circuit 215 controls the connection of the switch circuit 212 and the validity/invalidity of the step-down DC/DC converter 211 based on the voltage value of the PLC modem power supply voltage Vplc monitored by the voltage monitoring circuit 214.

Figure 10:
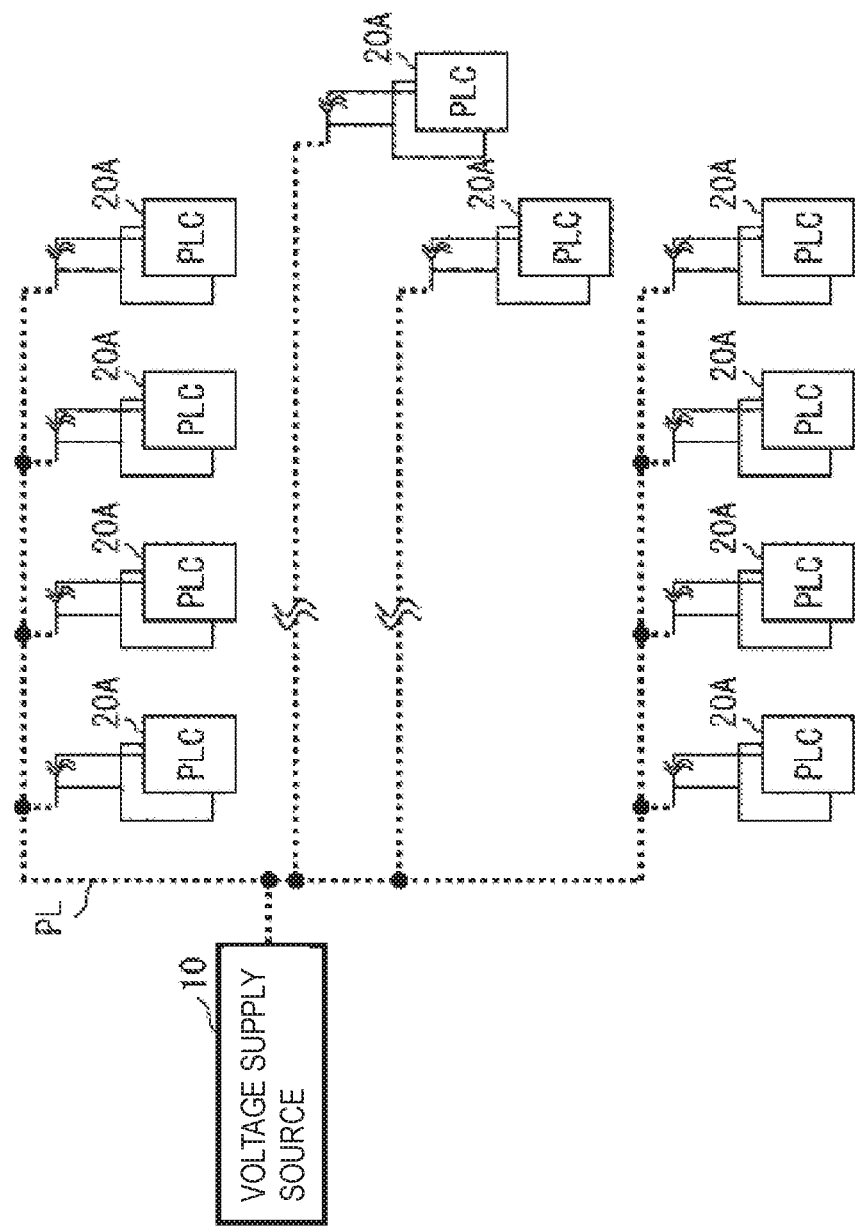
FIG. 10 is a diagram showing an example of configuration of a power supply system including the PLC modem according to the first embodiment.
Figure 11:
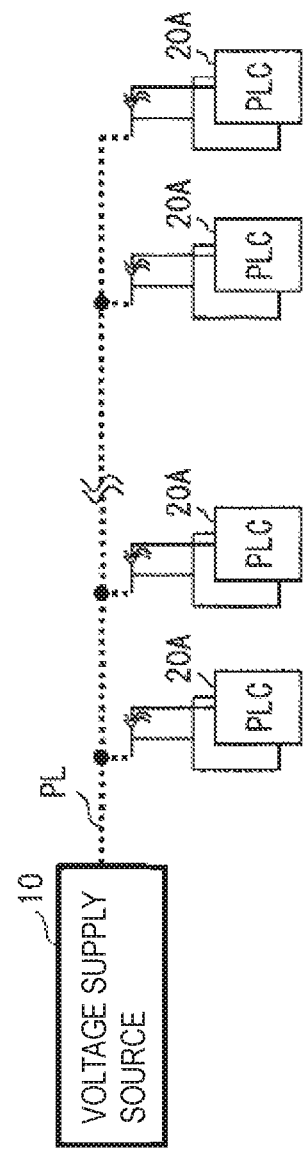
FIG. 11 is a diagram showing an example of a configuration of a power supply system including the PLC modem according to the first embodiment.

FIGS. 10 and 11 show examples of the configuration of a power supply system including the PLC modem 20A according to the present first embodiment. As shown in FIGS. 10 and 11, the PLC modem 20A according to the present first embodiment is one of a plurality of PLC modem 20A constituting the power supply system. The plurality of PLC modem 20A are connected to the voltage supply source 10 via the DC power line PLs. The connection mode between the plurality of PLC modem 20A and the voltage supply source 10 is star connection in the example shown in FIG. 10 and line connection in the example shown in FIG. 11. However, the connection mode between the plurality of PLC modem 20A and the voltage supply source 10 is not limited to the connection mode shown in FIGS. 10 and 11. The power supply system including the PLC modem 20B or 20C according to second embodiment or 3 described later has the same configuration as that of the power supply system including the PLC modem 20A according to present embodiment 1.

Figure 12:
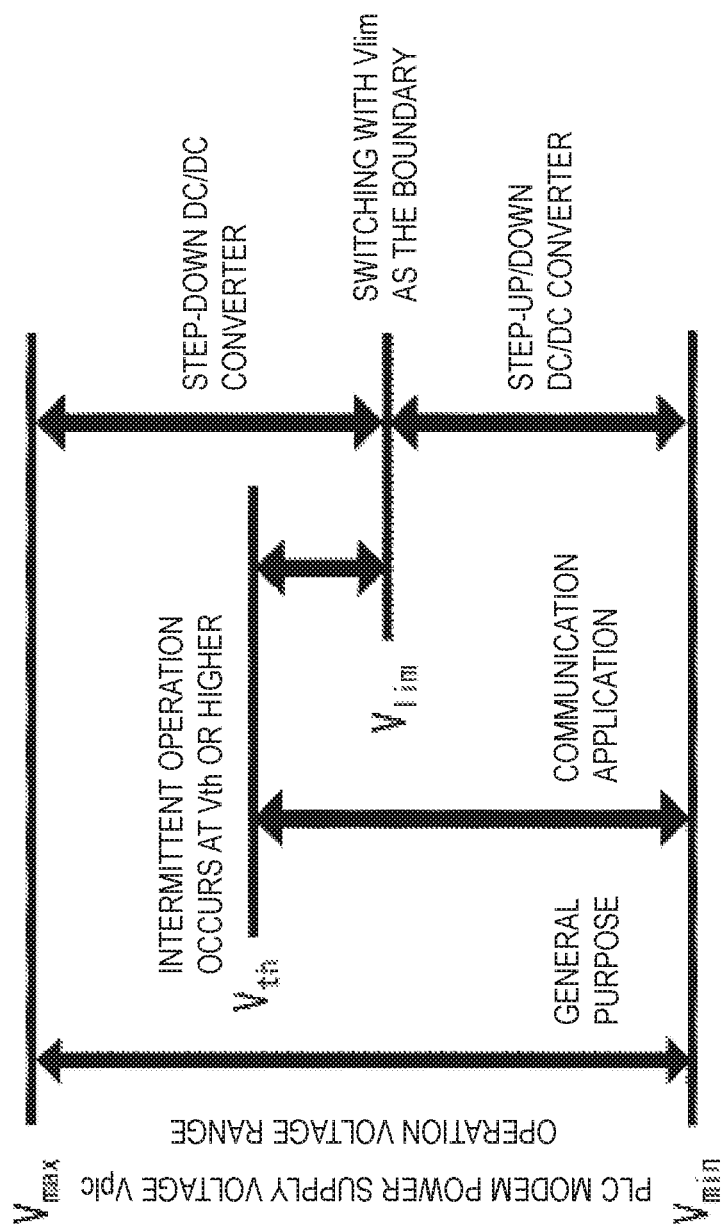
FIG. 12 is a diagram illustrating an example of a method of setting a switch voltage according to the first embodiment.

FIG. 12 shows examples of switch switching voltage setting methods according to the present first embodiment. Switch switching voltage is the voltage of the Vplc at the time of switching the connection of the switch circuit 212. In FIG. 12, the Vlim represents switch switching voltage. As described with reference to FIG. 8, the step-up/down DC/DC converter 213 cannot be used at voltages generated by intermittent operation when the step-down DC/DC converter (DC/DC converter 911 according to the related art) is used alone. The PLC modem power supply voltage Vplc is supplied from the DC/DC operation lower limit voltage V min to the Input maximum voltage V max to the step-down DC/DC converter 211 and the step-up/down DC/DC converter 213. Therefore, when the voltage of the PLC modem power supply voltage Vplc becomes equal to or higher than the voltage of the Vth, the voltage intermittent operation is generated. Therefore, as shown in FIG. 12, the switch switching voltage Vlim of the switch circuit 212 is set during the Vth in which intermittent operation is generated from the DC/DC operation lower limit voltage V min of the PLC modem power supply voltage Vplc.

For example, when the Vplc is equal to or lower than the Vlim, the potential difference between the V min and the Vplc is a potential difference at which intermittent operation is not generated in the step-up/down DC/DC converter 213. Therefore, even if the Vplc is directly supplied to the step-up/down DC/DC converter 213, no intermittent operation is generated. Therefore, the inputs of the step-up/down DC/DC converter 213 are connected to the DC power line PLs in order to provide the Vplc directly to the step-up/down DC/DC converter 213. On the other hand, when the Vplc exceeds the Vlim, when the Vplc further rises to a voltage equal to or higher than the Vth, the potential difference between the V min and the Vplc becomes a potential difference at which intermittent operation is generated in the step-up/down DC/DC converter 213. Therefore, when the Vplc is directly supplied to the step-up/down DC/DC converter 213, intermittent operation is generated. Therefore, the input of the step-up/down DC/DC converter 213 is connected to the output of the step-down DC/DC converter 211 in order to reduce the voltage of the Vplc and then supply it to the step-up/down DC/DC converter 213. Note that in FIG. 12, the Vth is set so that the potential difference between the V min and the Vth falls within a predetermined range in which intermittent operation does not occur, but the present invention is not limited thereto. The Vth may be set so that the potential difference between the V max and the Vth falls within a predetermined range. In this instance, the Vlim is set between the Vth and the V max.

As shown in FIG. 12, the switch switching voltage Vlim of the switch circuit 212 is set to a voltage at which the step-up/down DC/DC converter 213 does not intermittent operation. However, when the Vplc is at a voltage near the Vlim, the connection of the switch circuit 212 is frequently switched depending on the state of the DC power line PL, which adversely affects the communication characteristics of the DC-PLC communication. Therefore, by providing the Vlim with hysteretic characteristics, it is possible to prevent the switch circuit 212 from being frequently connected. That is, when the Vplc is rising, Vlim +α obtained by adding a to the Vlim is set to switch switching voltage, and when the Vplc voltage is decreasing, Vlim −α obtained by subtracting a from the Vlim is set to switch switching voltage. α is set to a value such that Vlim +α does not exceed Vth and Vlim −α does not fall below V min.

Hereinafter, the operation of the power supply circuit 21A according to the present embodiment 1 will be described. In the power supply circuit 21A according to the present first embodiment, the inputs of the step-up/down DC/DC converter 213 are connected to the DC power line PL as shown in FIG. 1, and the step-down DC/DC converter 211 is set to be invalid in the initial state prior to the start-up of the power supply circuit 21A. The invalidation of the step-down DC/DC converter 211 indicates that the step-down DC/DC converter 211 is placed in a deep standby state, i.e., a state in which it is stopped without operating. On the other hand, the validity of the step-down DC/DC converter 211 indicates that the step-down DC/DC converter 211 is activated. The power supply circuit 21A according to the present embodiment 1 performs the after activation of the power supply circuit 21A according to the operation flow shown in FIG. 13.

Figure 13:
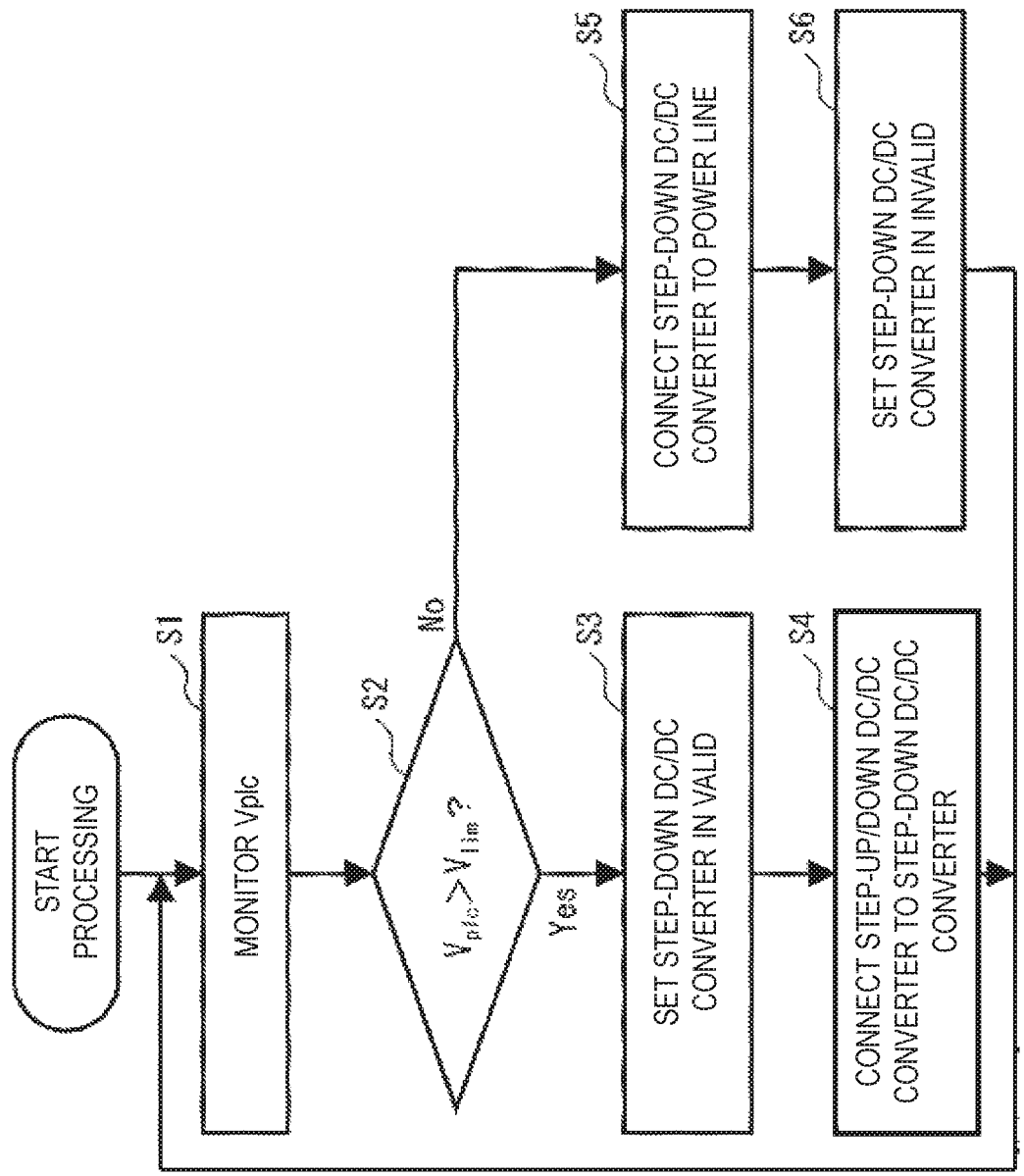
FIG. 13 is a diagram illustrating an example of an operation flow after activation of the power supply circuit according to the first embodiment.

FIG. 13 shows an exemplary operation flow of the after activation of the power supply circuit 21A according to the present first embodiment. As shown in FIG. 13, the voltage monitoring circuit 214 monitors the PLC modem power supply voltage Vplc supplied by the DC power line PL (step S1). The voltage monitoring circuit 214 converts the monitored Vplc into information that can be read by the control circuit 215, and passes the converted information to the control circuit 215. Thereafter, the control circuit 215 starts the process when the PLC modem power supply voltage Vplc changes. In operation S 2, the control circuit 215 determines whether the Vplc monitored by the voltage monitoring circuit 214 exceeds the switch switching voltage Vlim.

Figure 14:
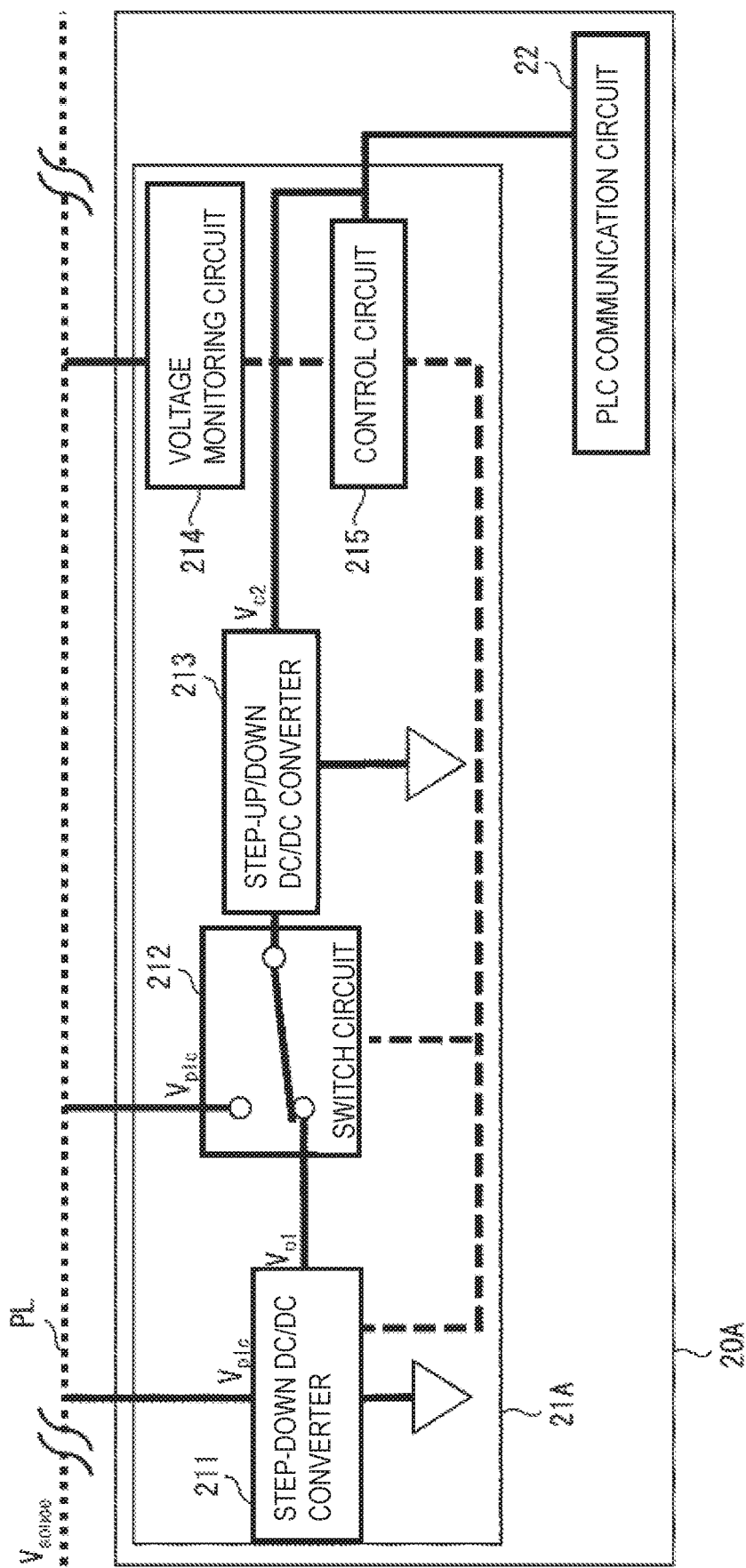
FIG. 14 is a diagram showing a configuration example of the PLC modem according to the first embodiment.

If the Vplc exceeds the Vlim (YES in step S 2), the control circuit 215 sets the step-down DC/DC converter 211 to valid (step S 3), and controls the switch circuit 212 to connect the inputs of the step-up/down DC/DC converter 213 to the outputs of the step-down DC/DC converter 211 (step S 4). FIG. 14 shows that the inputs of the step-up/down DC/DC converter 213 are connected to the outputs of the step-down DC/DC converter 211. Thereafter, the process returns to step S 1, and the process of step S 1 and thereafter is performed.

On the other hand, when the Vplc is equal to or lower than the Vlim (NO in step S 2), the control circuit 215 controls the switch circuit 212 to connect the inputs of the step-up/down DC/DC converter 213 to the DC power line PLs (step S 5), and also sets the step-down DC/DC converter 211 to be invalid (step S 6). The inputs of the step-up/down DC/DC converter 213 are connected to the DC power line PLs as shown in FIG. 1. Thereafter, the process returns to step S 1, and the process of step S 1 and thereafter is performed.

As described above, according to the present embodiment 1, the PLC modem power supply voltage Vplc supplied from the DC power line PL is input to the step-down DC/DC converter 211, and the input Vplc is stepped down to be output as the output voltage V o1. The V o1 output from the step-down DC/DC converter 211 or the Vplc supplied from the DC power line PL is input to the step-up/down DC/DC converter 213, and the input V o1 or Vplc is boosted or stepped down to be output to the PLC communication circuit 22. The switch circuit 212 connects the inputs of the step-up/down DC/DC converter 213 to the outputs or DC power line PLs of the step-down DC/DC converter 211. The voltage monitoring circuit 214 monitors the Vplc supplied from the DC power line PLs. The control circuit 215 controls the connectivity of the switch circuit 212 based on the voltage value of the Vplc monitored by the voltage monitoring circuit 214.

Therefore, according to the present embodiment 1, when the distance from the voltage supply source 10 becomes a long distance and the voltage value of the Vplc is low, the Vplc can be boosted by the step-up/down DC/DC converter 213. As a result, the PLC modem operation voltage lower limit range of the PLC modem 20A can be widened, so that the transmission distance with the voltage supply source 10 can be extended. Further, according to the present first embodiment, when the voltage value of the Vplc is high, the Vplc can be stepped down by the step-down DC/DC converter 211, and the stepped down voltage can be supplied to the step-up/down DC/DC converter 213. Therefore, the potential difference at the inputs of the step-up/down DC/DC converter 213 is suppressed from becoming a potential difference at which intermittent operation is generated in the step-up/down DC/DC converter 213. As a result, noises are suppressed from being generated in the frequency band used in the DC-PLC communication due to the effect of the intermittent operation of the step-up/down DC/DC converter 213, so that the communication performance of the DC-PLC communication can be improved.

Figure 15:
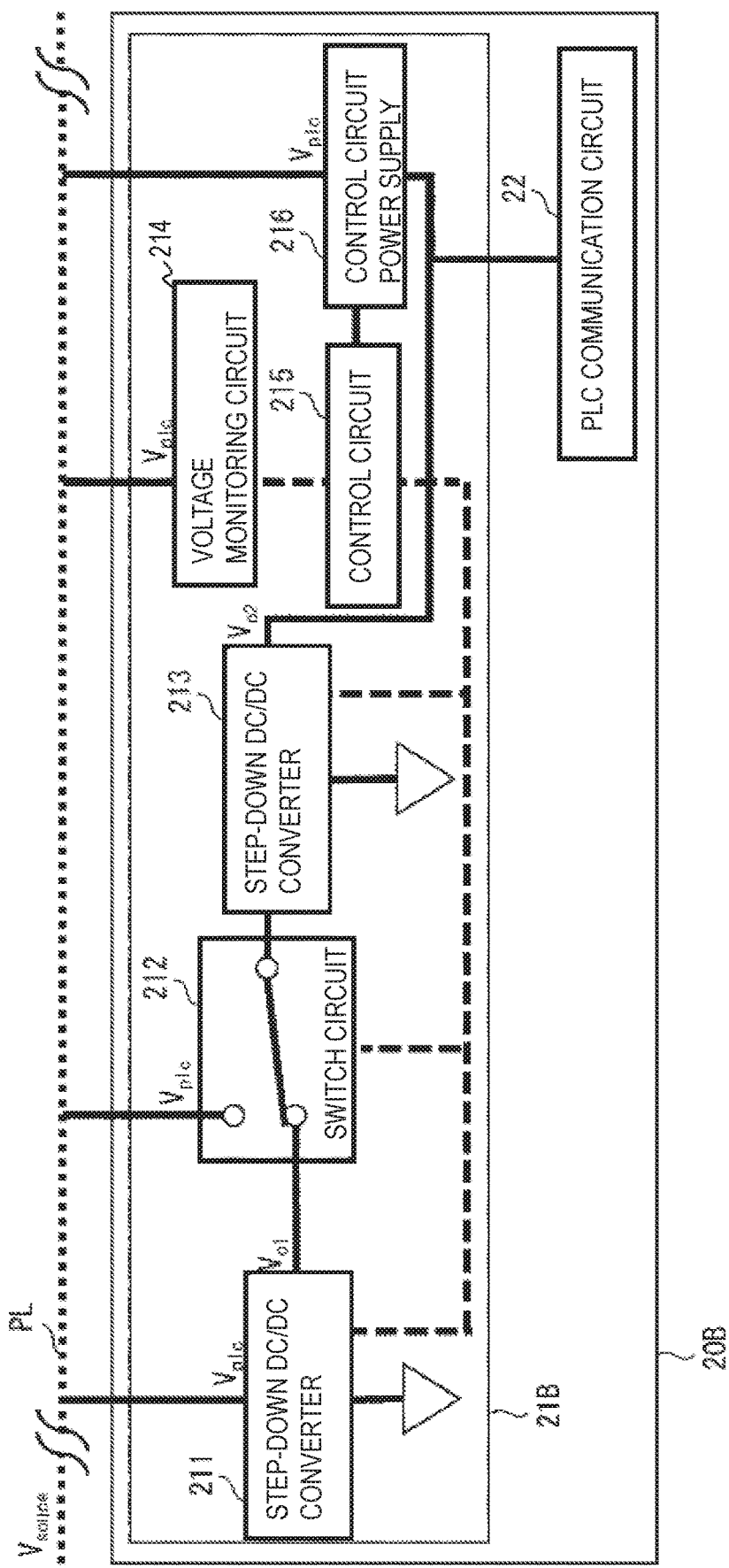
FIG. 15 is a diagram showing a configuration example of a PLC modem according to a second embodiment.

FIG. 15 shows an exemplary configuration of a PLC modem 20B according to the present second embodiment. As shown in FIG. 15, PLC modem 20B according to present embodiment 2 differs from PLC modem 20A according to first embodiment shown in FIG. 9 in that power supply circuit 21A is replaced by power supply circuit 21B. The power supply circuit 21B differs from the power supply circuit 21A in that the control circuit power supply 216 is added, the power supply line route for supplying power supply voltage to the control circuit 215 is changed, and the control circuit 215 and the step-up/down DC/DC converter 213 are connected by control line.

The control circuit power supply 216 is a power supply for the control circuit 215. The control circuit power supply 216 first provides the PLC modem power supply voltage Vplc supplied from the DC power line PL as a power supply voltage to the control circuit 215 and then provides the output voltage Vo2 output from the step-up/down DC/DC converter 213 as a power supply voltage to the control circuit 215 by the after activation of the power supply circuit 21B.

Figure 16:
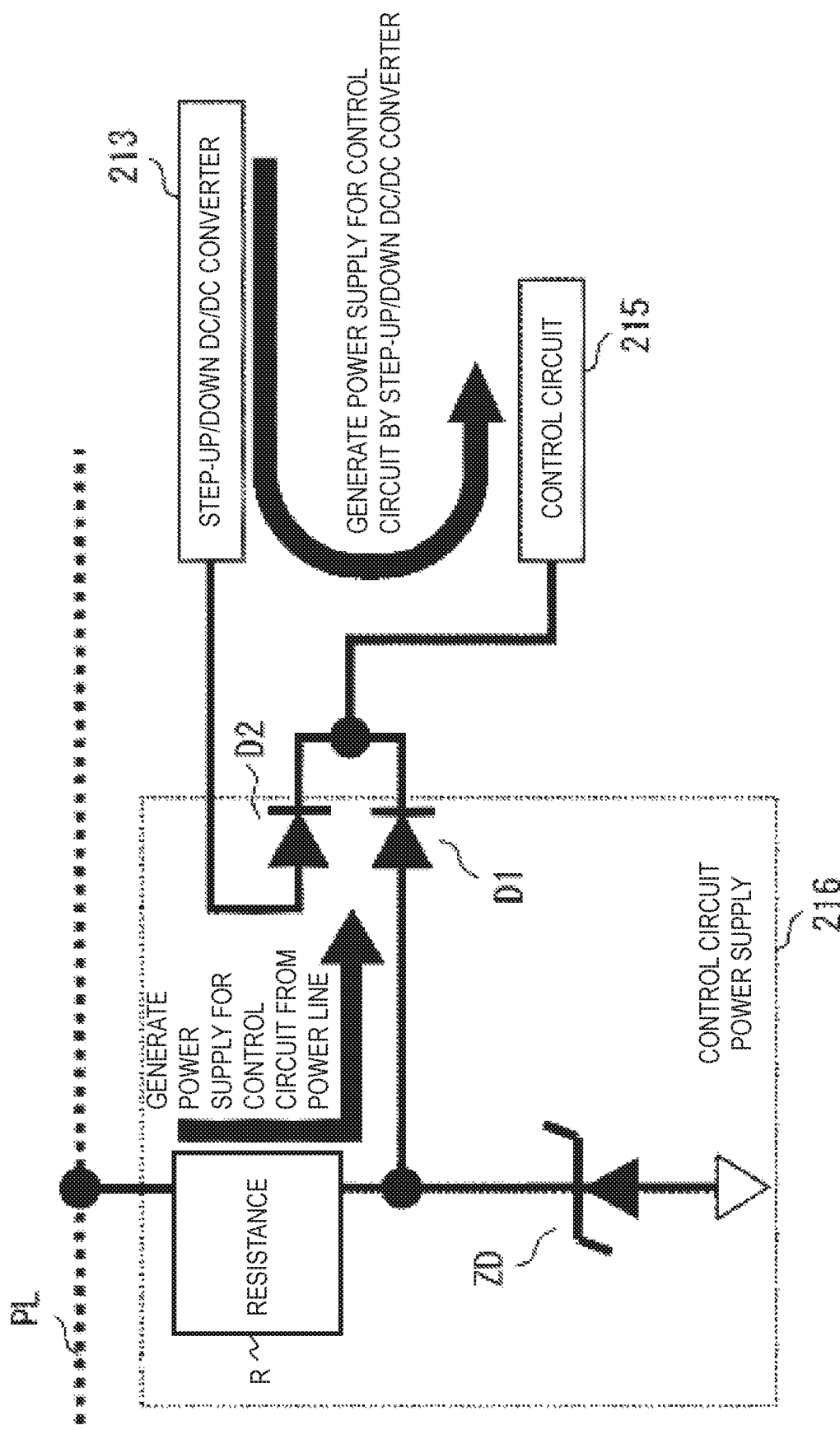
FIG. 16 is a diagram showing an example of configuration of a control circuit power supply according to the second embodiment.

FIG. 16 shows an exemplary configuration of the control circuit power supply 216 according to the present second embodiment. As shown in FIG. 16, the control circuit power supply 216 according to present embodiment 2 includes a resistance element R 1, a zener diode Z D, and two diode D 1 and D 2. The resistance element R 1 has one end connected to the DC power line PL and the other end connected to the cathode of the zener diode ZD. The anode of the diode D 1 is connected to the output of the step-up/down DC/DC converter 213, and the anode of the diode D 2 is connected to the node between the resistance element R 1 and the zener diode ZD. The cathodes of the diode D 1, D 2 are connected to the control circuit 215.

In the power supply circuit 21B according to the present second embodiment, the inputs of the step-up/down DC/DC converter 213 are connected to the outputs of the step-down DC/DC converter 211, as shown in FIG. 15, and the step-down DC/DC converter 211 and the step-up/down DC/DC converter 213 are set to be invalid in the initial state prior to the start-up of the power supply circuit 21B. Therefore, power supply voltage is not supplied to the control circuit 215 in the initialization prior to the activation of the power supply circuit 21B. Therefore, in the after activation of the power supply circuit 21B, the control circuit power supply 216 generates a power supply voltage for the control circuit 215 from the Vplc supplied from the DC power line PL, and supplies the generated power supply voltage to the control circuit 215. The control circuit 215 is activated in response to the power supply voltage, and sets the step-down DC/DC converter 211 and the step-up/down DC/DC converter 213 to valid. Therefore, when the Vplc is equal to or higher than the operation voltage of the step-down DC/DC converter 211, the output voltage V o2 is output from the step-up/down DC/DC converter 213. Then, the control circuit power supply 216 switches the power supply voltage supplied to the control circuit 215 to the V o2.

In the after activation of the power supply circuit 21B, the power supply circuit 21B according to the present embodiment 2 performs the operation according to the operation flow shown in FIG. 13, similarly to the first embodiment, after the power supply voltage supplied to the control circuit 215 is switched to the V o2. That is, as shown in FIG. 13, the voltage monitoring circuit 214 monitors the Vplc (step S 1), and the control circuit 215 determines whether or not the Vplc exceeds the Vlim (step S 2). Note that the switch switching voltage Vlim according to present embodiment 2 is set during the Vth in which intermittent operation is generated from the DC/DC operation lower limit voltage Vmin of the PLC modem power supply voltage Vplc, similarly to first embodiment.

If the Vplc exceeds the Vlim (YES in step S 2), the control circuit 215 sets the step-down DC/DC converter 211 to valid (step S 3), and controls the switch circuit 212 to connect the inputs of the step-up/down DC/DC converter 213 to the outputs of the step-down DC/DC converter 211 (step S 4). FIG. 15 shows a state in which the inputs of the step-up/down DC/DC converter 213 are connected to the outputs of the step-down DC/DC converter 211.

Figure 17:
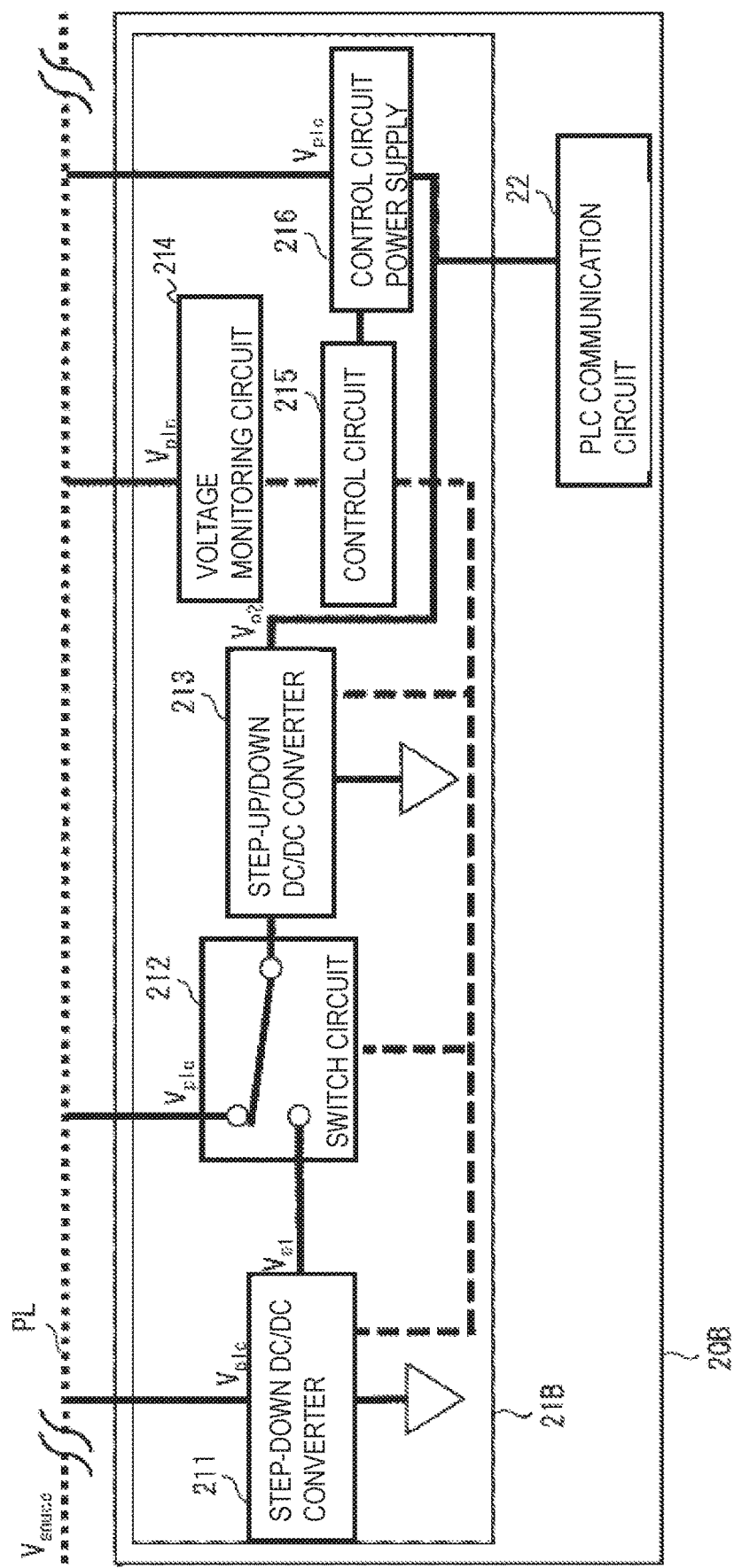
FIG. 17 is a diagram showing a configuration example of a PLC modem according to a second embodiment.

On the other hand, when the Vplc is equal to or lower than the Vlim (NO in step S 2), the control circuit 215 controls the switch circuit 212 to connect the inputs of the step-up/down DC/DC converter 213 to the DC power line PLs (step S 5), and also sets the step-down DC/DC converter 211 to be invalid (step S 6). FIG. 17 shows that the inputs of the step-up/down DC/DC converter 213 are connected to the DC power line PLs.

In the first embodiment described above, the inputs of the switch circuit 212 need to be connected to the DC power line PLs prior to startup. This is because when the input of the switch circuit 212 is connected to the output of the step-down DC/DC converter 211, if the Vplc supplied from the DC power line PL is less than the operation voltage of the step-down DC/DC converter 211, the power supply voltage cannot be supplied to the control circuit 215. Therefore, in the first embodiment, the maximum voltage of the Vplc inputted from the DC power line PL to the power supply circuit 21A is limited to the maximum operating voltage of the step-up/down DC/DC converter 213.

On the other hand, in the present embodiment 2, the after activation first supplies the Vplc supplied from the DC power line PL as power supply voltage to the control circuit 215, and then supplies the Vo2 outputted from the step-up/down DC/DC converter 213 as power supply voltage to the control circuit 215. As a result, in the present embodiment 2, the maximum voltage of the Vplc inputted from the DC power line PL to the power supply circuit 21A is not limited to the operation upper limit voltage of the step-up/down DC/DC converter 213 as in the case of the first embodiment, and the maximum voltage can be used up to the Input maximum voltage of the step-down DC/DC converter 211.

Figure 18:
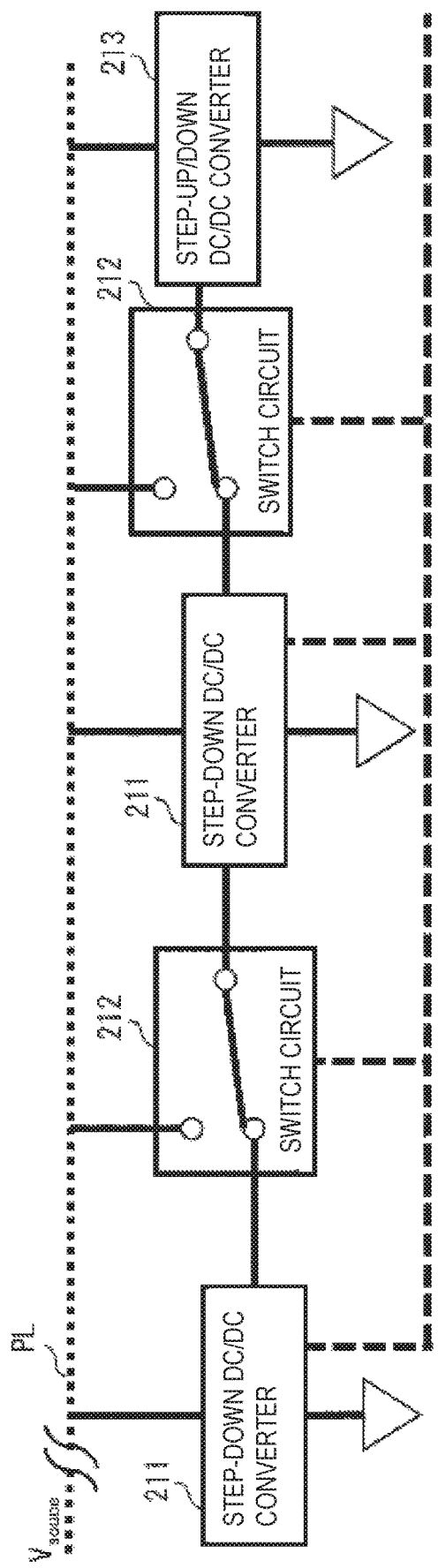
FIG. 18 is a diagram showing a configuration example of a modification of the power supply circuit according to the second embodiment.

FIG. 18 shows a configuration example of the modified example of the power supply circuit 21B according to present embodiment 2 in the <second embodiment modified example>. Note that, in FIG. 18, a configuration at a stage subsequent to the step-up/down DC/DC converter 213 is not illustrated. The configuration shown in FIG. 14 is a configuration in which only one pair of the step-down DC/DC converter 211 and the switch circuit 212 is provided. On the other hand, the configuration shown in FIG. 18 has a configuration in which a plurality of pairs of the step-down DC/DC converter 211 and the switch circuit 212 are provided. In this instance, the switch circuit 212 of the last stage connects the input of the step-up/down DC/DC converter 213 to the output or DC power line PL of the step-down DC/DC converter 211 of the self-stage, and the switch circuit 212 other than the last stage connects the input of the step-down DC/DC converter 211 of the next-stage to the output or DC power line PL of the self-stage step-down DC/DC converter 211. Therefore, even when the voltage value of the Vplc is very high, the Vplc can be sufficiently stepped down by the plurality of step-down DC/DC converter 211 and then supplied to the step-up/down DC/DC converter 213. Therefore, compared with the configuration of the first embodiment shown in FIG. 9 and the second embodiment shown in FIG. 14, it is possible to cope with a very high voltage value of the Vplc.

Figure 19:
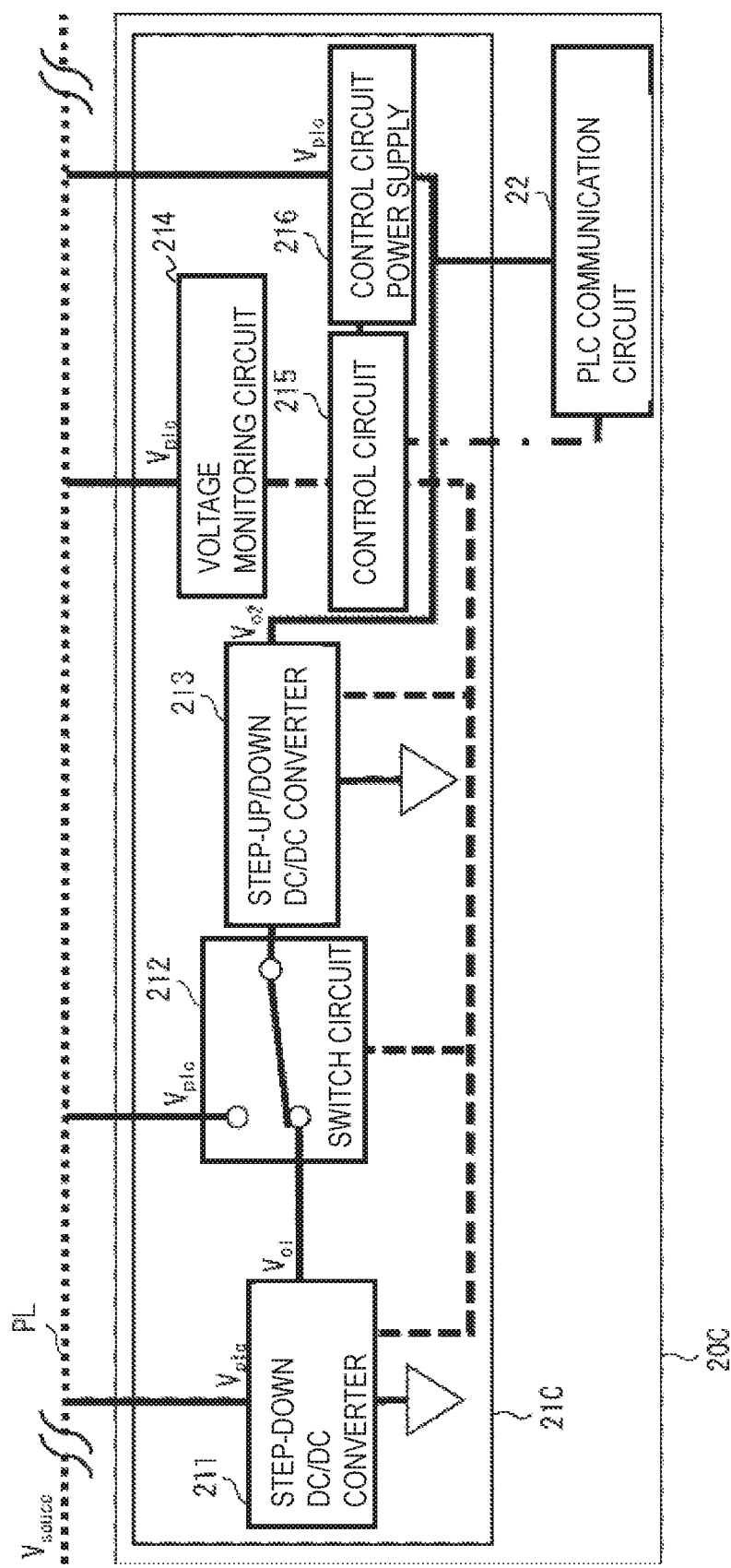
FIG. 19 is a diagram showing an example of configuration of a PLC modem according to the third embodiment.

FIG. 19 shows an exemplary configuration of a PLC modem 20C according to the present third embodiment. As shown in FIG. 19, the PLC modem 20C according to present embodiment 3 differs from the PLC modem 20B according to second embodiment shown in FIG. 15 in that the power supply circuit 21B is replaced with the power supply circuit 21C. The power supply circuit 21C differs from the power supply circuit 21B in that the control circuit 215 and the PLC communication circuit 22 are connected by a communication status notification line. The communication status notification line is a control line for notifying the presence or absence of PLC signals on the DC power line PL. In FIG. 19, it is assumed that a dashed line indicates a communication state notification line.

Figure 20:
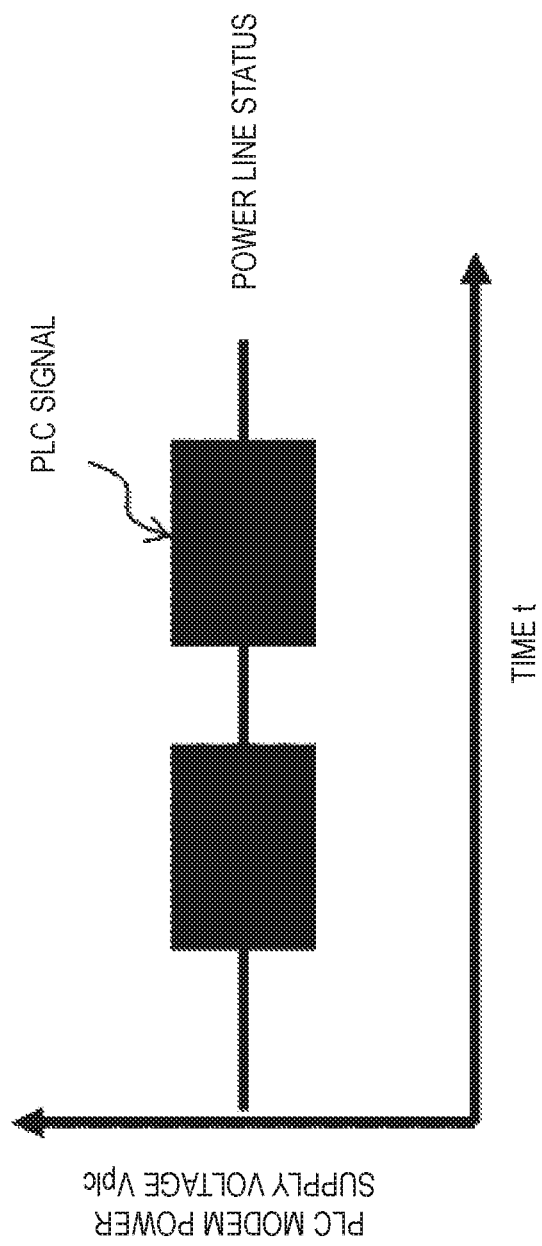
FIG. 20 is a diagram showing an example of voltage fluctuation of a DC power line at the time of DC-PLC communication.

FIG. 20 shows examples of variations in voltages of DC power line PLs during DC-PLC communication. As shown in FIG. 20, in the DC-PLC communication, the PLC signal having the maximum shake range of ±12 V is superimposed on the DC power line PL signal to perform the communication. Therefore, when the connection of the switch circuit 212 is switched while the PLC signal is being transmitted and received, the power supply voltage V o2 supplied to the PLC communication circuit 22 at the time of the switching varies, so that the PLC signal cannot be normally transmitted and received.

Therefore, in control circuit 215, a communication status notification line is added between the control circuit 215 and the PLC communication circuit 22 in order to confirm the presence or absence of PLC signals on the DC power line PL. Then, the control circuit 215 causes the voltage monitoring circuit 214 to monitor the PLC modem power supply voltage Vplc at a time when the PLC signals do not exist on the DC power line PL. This makes it possible to accurately monitor the values of the Vplc. When PLC signals are present on the DC power line PL, the control circuit 215 does not switch the connections of the switch circuit 212. As a result, when the PLC signal exists on the DC power line PL, the switching of the switch circuit 212 does not occur, so that the switching of the switch circuit 212 is suppressed from affecting the transmission and reception of the PLC signal.

Figure 21:
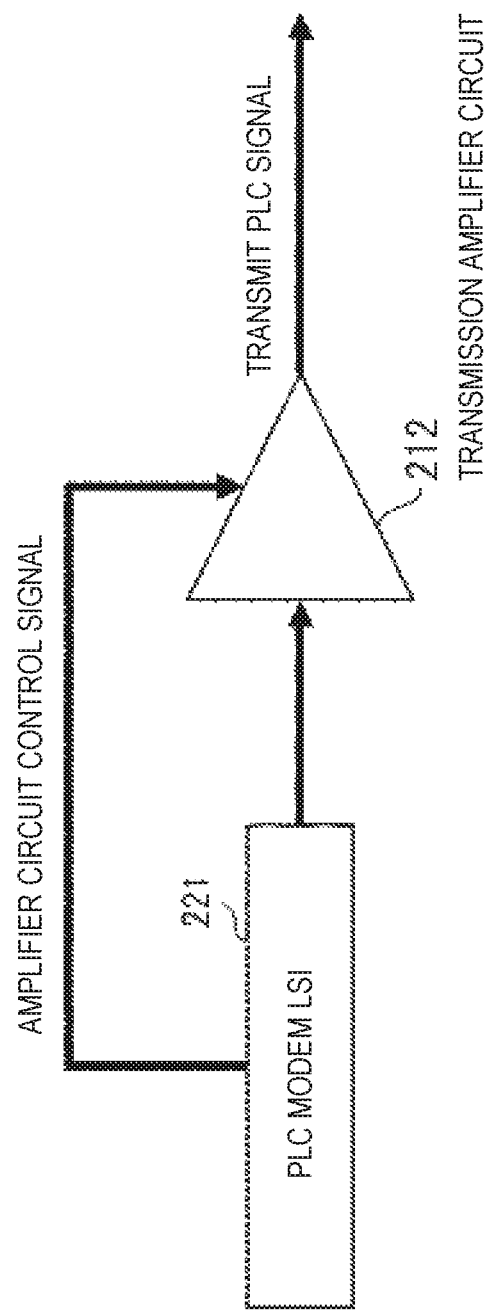
FIG. 21 is a diagram of a configuration example of a transmission circuit in a PLC communication circuit according to a third embodiment.
Figure 22:
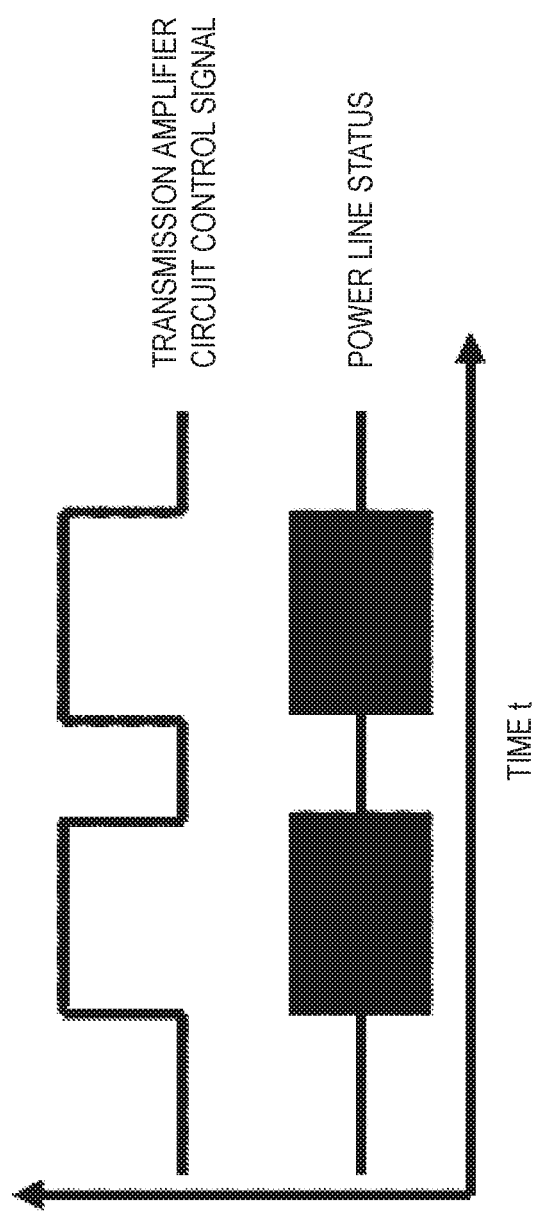
FIG. 22 is a diagram showing an example of the relationship between the amplifier control signal and the transmission PLC signal in the transmission circuit shown in FIG. 21.

FIG. 21 shows an exemplary configuration of the transmitter in the PLC communication circuit 22 according to the present third embodiment. FIG. 22 shows examples of the relation between the amplifier control signals and transmit PLC signal in the transmitter shown in FIG. 21. As shown in FIG. 21, the transmitting circuits in the PLC communication circuit 22 include a PLC modem LSI 221 and a transmission amplifier circuit 222. When the PLC signal is sent to the DC power line PL, the PLC modem LSI 221 needs to control the transmission amplifier circuit 222 in order to amplify the PLC signal by the transmission amplifier circuit 222. Therefore, the PLC modem LSI 221 outputs a amplifier circuit control signal to ON/OFF the transmission amplifier circuit 222. Therefore, the PLC communication circuit 22 can determine whether or not PLC signals are present on the DC power line PL by monitoring the amplifier circuit control signal.

Figure 23:
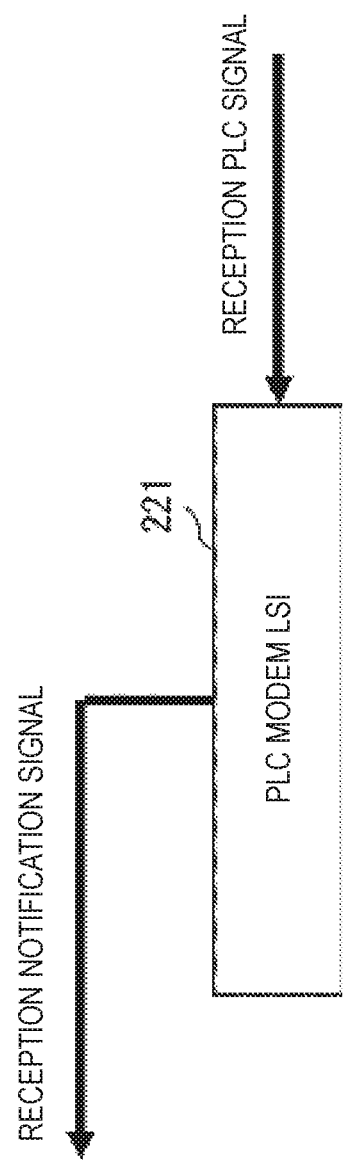
FIG. 23 shows a configuration example of a reception circuit in the PLC communication circuit 22 according to the third embodiment.
Figure 24:
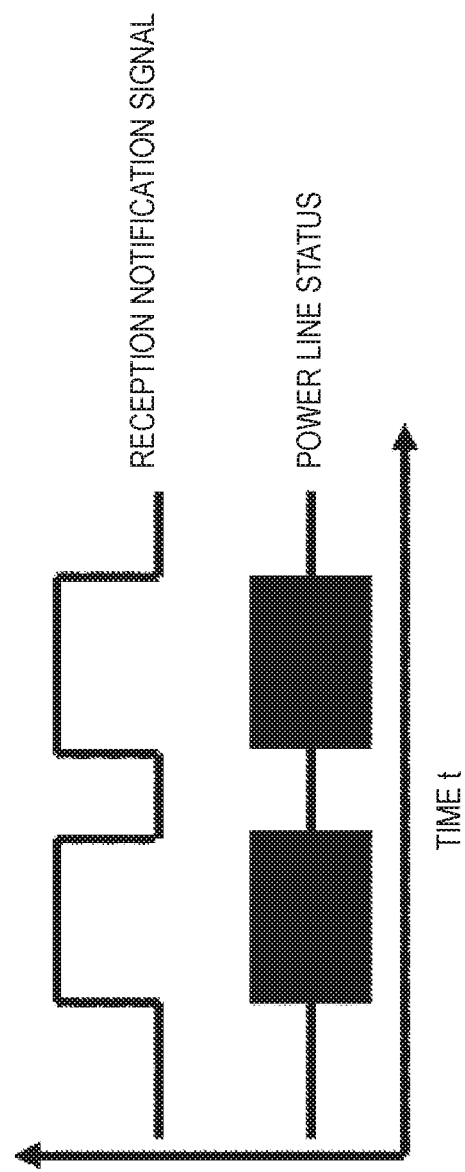
FIG. 24 is a diagram showing an example of the relationship between the reception notification signal and the reception PLC signal in the reception circuit shown in FIG. 23.

FIG. 23 shows an exemplary configuration of receiving circuits in the PLC communication circuit 22 according to the present third embodiment. FIG. 24 shows examples of the relation between reception notification signal and reception PLC signal in the receiving circuits shown in FIG. 23. As shown in FIG. 23, the receiving circuits in the PLC communication circuit 22 include the PLC modem LSI 221 described above. The PLC modem LSI 221 checks the PLC signal transmitted on the DC power line PL, and starts a receiving operation when it detects a synchronization signal in the PLC signal. When the reception operation is started, the PLC modem LSI 221 outputs reception notification signal to the outside. Therefore, the PLC communication circuit 22 can determine whether or not PLC signals are present on the DC power line PL by monitoring the reception notification signal. The control circuit 215 itself may determine whether or not PLC signals are present on the DC power line PL. In this instance, the control circuit 215 may monitor the amplifier circuit control signal and the reception notification signal via the communication status notification line to determine whether or not PLC signals are present on the DC power line PL.

Note that the power supply circuit 21C according to present embodiment 3 operates similarly to the second embodiment except that the Vplc is monitored when the PLC signal does not exist on the DC power line PL and that the switch circuit 212 is not switched when the PLC signal exists on the DC power line PL. Therefore, the explanation of the operation of the power supply circuit 21C according to the present embodiment 3 is omitted.

As described above, according to the present third embodiment, the presence or absence of PLC signals on the DC power line PL is notified from the PLC communication circuit 22. The PLC modem power supply voltage Vplc is monitored when no PLC signals are present on the DC power line PL. Thus, in the present third embodiment, the Vplc can be accurately monitored. According to present embodiment 3, when PLC signals are present on the DC power line PL, the switch circuit 212 is not switched. As a result, in the present embodiment 3, the switching of the connections of the switch circuit 212 is prevented from affecting the transmission and reception of PLC signals.

Although the invention made by the inventor has been specifically described based on the embodiment, the present invention is not limited to the embodiment already described, and it is needless to say that various modifications can be made without departing from the gist thereof.

For example, although the above-described third embodiment is based on the configuration of second embodiment, it may be based on the configuration of first embodiment.

In the above-described embodiment, the functional blocks of the power supply circuit are implemented in hardware, but all or part of the functional blocks of the power supply circuit may be implemented in software by programs read from the memory or the like. In this instance, the power supply circuit can be configured by a computer including a processor such as a CPU (Central Processing Unit) for performing arithmetic processing, control processing, and the like, programs read and executed by the processor, memories for storing various data, and the like. Therefore, it is understood by those skilled in the art that these functional blocks can be realized in various forms by hardware alone, software alone, or a combination thereof, and the present invention is not limited to any of them.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks, CD-ROM (compact disc read only memory), CD-R (compact disc recordable), CD-R/W (compact disc rewritable, solid-state memories (e.g., masked ROM, PROM (programmable ROM), EPROM (erasable PROM, flash ROM, RAM (random access memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

What is claimed is:

1. A power supply circuit comprising:
a step-down DC/DC converter that outputs a step-down voltage obtained by stepping down a voltage supplied from a power line;
a step-up/down DC/DC converter that outputs a voltage obtained by stepping up or stepping down the step-down voltage or the voltage supplied from the power line to a power line communication circuit;
a switch circuit that connects an input of the step-up/down DC/DC converter to an output of the step-down DC/DC converter or the power line; and
a control circuit that controls connection of the switch circuit based on a voltage value of the voltage supplied from the power line,
wherein the control circuit controls the switch circuit to connect the input of the step-up/down DC/DC converter to the output of the step-down DC/DC converter if the voltage value of the voltage supplied from the power line exceeds a switching voltage, and
wherein the control circuit controls the switch circuit to connect the input of the step-up/down DC/DC converter to the power line if the voltage value of the voltage supplied from the power line is less than or equal to the switching voltage.

2. The power supply circuit according to claim 1, further comprising:
a voltage monitoring circuit for monitoring the voltage supplied from the power line.

3. The power supply circuit according to claim 1, wherein the switching voltage is set between a lower limit voltage at which the step-up/down DC/DC converter operates and a voltage at which intermittent operation is generated in the step-up/down DC/DC converter.

4. The power supply circuit according to claim 1, wherein the control circuit sets a voltage value obtained by adding a predetermined value to the switching voltage to the switching voltage when the voltage supplied from the power line is increasing, and sets a voltage value obtained by subtracting a predetermined value from the switching voltage to the switching voltage when the voltage supplied from the power line is decreasing.

5. The power supply circuit according to claim 4, wherein, in an initial state prior to activation of the power supply voltage:
the step-down DC/DC converter and the step-up/down DC/DC converter are set to invalid and the inputs of the step-up/down DC/DC converter are connected to the output of the step-down DC/DC converter;
the control circuit power supply first supplies the control circuit with the voltage supplied from the power line as power supply circuit;
the after activation of the power supply circuit supplies the power supply voltage with the voltage supplied from the control circuit;
the control circuit sets the step-down DC/DC converter and the step-up/down DC/DC converter to valid when activated with the power supply voltage supply; and
the control circuit power supply thereafter supplies the voltage output from the step-up/down DC/DC converter as the power supply voltage of the control circuit.

6. The power supply circuit according to claim 1, further comprising a control circuit power supply configured to supply a power supply voltage to the control circuit,
wherein after activation of the power supply circuit, the control circuit power supply first supplies the voltage supplied from the power line to the control circuit as the power supply voltage, and then supplies a voltage outputted from the step-up/down DC/DC converter to the control circuit as the power supply voltage.

7. The power supply circuit according to claim 1,
wherein a plurality of stages of the step-down DC/DC converter and the switch circuit are provided, the switch circuit of a last stage of the plurality of stages connects the input of the step-up/down converter to the output of the step-down DC/DC converter of self-stage or to the power line, and
wherein the switch circuit other than the last stage connects the input of the step-down DC/DC converter of next-stage to the output of the step-down DC/DC converter of self-stage or to the power line.

8. The power supply circuit according to claim 7, further comprising:
a voltage monitor circuit for monitoring the voltage supplied from the power line,
wherein the control circuit causes the voltage monitor circuit to monitor a voltage supplied from the power line at a timing when no communication signal exists on the power line.

9. The power supply circuit according to claim 1, wherein the control circuit is notified of a presence or an absence of a communication signal on the power line from the power line communication circuit, and does not switch the connection of the switch circuit when the communication signal is present on the power line.

10. A power supply system comprising:
a voltage supply source for supplying the voltage to the power line; and
a plurality of the power supply circuits according to claim 1 connected to the voltage supply via the power line.

11. A control method of a power supply circuit, the power supply circuit comprising:
a step-down DC/DC converter that outputs a step-down voltage obtained by stepping down a voltage supplied from a power line;
a step-up/down DC/DC converter which outputs a voltage obtained by stepping up or stepping down the step-down voltage or the voltage supplied from the power line to a power line communication circuit;
a switch circuit that connects an input of the step-up/down DC/DC converter to an output of the step-down DC/DC converter or the power line;
a voltage monitoring circuit for monitoring a voltage supplied from the power line; and
a control circuit that controls connection of the switch circuit based on a voltage value of the voltage supplied from the power line,
the control method comprising:
controlling the connection of the switch circuit based on the voltage value of the voltage supplied from the power line,
wherein the power supply circuit further comprises:
a control circuit; and
a control circuit power supply configured to supply a power supply voltage to the control circuit, and
wherein after activation of the power supply circuit, the control circuit power supply first supplies a voltage supplied from the power line to the control circuit as the power supply voltage, and then supplies a voltage outputted from the step-up/down DC/DC converter to the control circuit as the power supply voltage.

12. The control method according to claim 11,
wherein the switch circuit is controlled to connect the input of the step-up/down DC/DC converter to the output of the step-down DC/DC converter if the voltage value of the voltage supplied by the power line exceeds a switching voltage, and
wherein the switch circuit is controlled to connect the input of the step-up/down DC/DC converter to the power line if the voltage value of the voltage supplied by the power line is less than or equal to the switching voltage.

13. The control method according to claim 12, wherein the switching voltage is set between a lower limit voltage at which the step-up/down DC/DC converter operates and a voltage at which intermittent operation is generated in the step-up/down DC/DC converter.

14. The control method according to claim 12,
wherein when the voltage supplied from the power line is rising, the voltage value obtained by adding a predetermined value to the switching voltage is set to the switching voltage, and
wherein when the voltage supplied from the power line is decreasing, the voltage value obtained by subtracting a predetermined value from the switching voltage is set to the switching voltage.

15. The control method according to claim 14, wherein in an initial state prior to activation of the power supply voltage:
the step-down DC/DC converter and the step-up/down DC/DC converter are set to invalid and the inputs of the step-up/down DC/DC converter are connected to the output of the step-down DC/DC converter;
the control circuit power supply first supplies the control circuit with the voltage supplied from the power line as power supply circuit;
the after activation of the power supply circuit supplies the power supply voltage with the voltage supplied from the control circuit;
the control circuit sets the step-down DC/DC converter and the step-up/down DC/DC converter to valid when activated with the supply of power supply voltage; and
the control circuit power supply thereafter supplies the voltage output from the step-up/down DC/DC converter as the power supply voltage of the control circuit.

16. The control method according to claim 11,
wherein a plurality of stages of the step-down DC/DC converter and the switch circuit are provided,
wherein the switch circuit of the last stage connects the input of the step-up/down converter to the output of the step-down DC/DC converter of self-stage or to the power line, and
wherein the switch circuit other than the last stage connects the input of the step-down DC/DC converter of next-stage to the output of the step-down DC/DC converter of self-stage or to the power line.

17. The control method according to claim 12,
wherein a presence or an absence of a communication signal on the power line is notified from the power line communication circuit, and
wherein the connection of the switch circuit is not switched when the communication signal is present on the power line.

18. The control method according to claim 16, wherein the voltage monitoring circuit is caused to monitor the voltages supplied from the power line when no communication signal is present on the power line.

19. A power supply circuit comprising:
a step-down DC/DC converter that outputs a step-down voltage obtained by stepping down a voltage supplied from a power line;
a step-up/down DC/DC converter that outputs a voltage obtained by stepping up or stepping down the step-down voltage or the voltage supplied from the power line to a power line communication circuit;
a switch circuit that connects an input of the step-up/down DC/DC converter to an output of the step-down DC/DC converter or the power line; and
a control circuit that controls connection of the switch circuit based on a voltage value of the voltage supplied from the power line,
wherein a plurality of stages of the step-down DC/DC converter and the switch circuit are provided,
wherein the switch circuit of a last stage connects the input of the step-up/down converter to the output of the step-down DC/DC converter of a self-stage or to the power line, and
wherein the switch circuit, other than the last stage, connects the input of the step-down DC/DC converter of next-stage to the output of the step-down DC/DC converter of the self-stage or to the power line.

* * * * *